US012626278B2

(12) United States Patent
Liu

(10) Patent No.: US 12,626,278 B2
(45) Date of Patent: May 12, 2026

(54) ADVERTISEMENT DISPLAY SYSTEM AND METHOD

(71) Applicant: Huawei Technologies Co., Ltd., Shenzhen (CN)

(72) Inventor: Tao Liu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 18/548,740

(22) PCT Filed: Feb. 25, 2022

(86) PCT No.: PCT/CN2022/078014
§ 371 (c)(1),
(2) Date: Sep. 1, 2023

(87) PCT Pub. No.: WO2022/183989
PCT Pub. Date: Sep. 9, 2022

(65) Prior Publication Data
US 2024/0152965 A1     May 9, 2024

(30) Foreign Application Priority Data

Mar. 1, 2021   (CN) .......................... 202110224810.5

(51) Int. Cl.
*G06Q 30/02* (2023.01)
*G06Q 30/0251* (2023.01)
(52) U.S. Cl.
CPC ..... *G06Q 30/0257* (2013.01); *G06Q 30/0261* (2013.01)

(58) Field of Classification Search
CPC .......... G06Q 30/0257; G06Q 30/0261; G06Q 30/0242; G06Q 30/0251; G06Q 30/0276; G06Q 30/0269; G06Q 30/0207–30/0277; G06F 9/461; G06F 3/0484; G06F 9/451; G06F 9/4843
See application file for complete search history.

(56) References Cited

U.S. PATENT DOCUMENTS

| | | | | |
|---|---|---|---|---|
| 9,785,974 B1* | 10/2017 | Periasamy | ......... | G06Q 30/0267 |
| 2009/0254824 A1 | 10/2009 | Singh | | |
| 2010/0299213 A1* | 11/2010 | Yeganeh | ................ | G06Q 30/02 705/14.71 |
| 2012/0253939 A1* | 10/2012 | Grigoriev | .......... | G06Q 30/0251 705/14.49 |

(Continued)

FOREIGN PATENT DOCUMENTS

CN          102982470 A      3/2013

*Primary Examiner* — Thuy N Nguyen
(74) *Attorney, Agent, or Firm* — Conley Rose, P.C.

(57) ABSTRACT
A method includes: a terminal device that detects a first operation of a user, obtains, in response to the first operation, context information corresponding to a current scenario of the terminal device, generates the first advertisement request based on the context information, sends the first advertisement request to an advertisement server, obtains first advertisement information that is fed back by the advertisement server and that indicates first advertisement content, and displays the first advertisement content based on the first advertisement information, where the context information is associated with the first advertisement content.

20 Claims, 22 Drawing Sheets

(56)　　　　　References Cited

U.S. PATENT DOCUMENTS

| 2013/0254038 | A1 * | 9/2013 | Bradley | G06Q 30/0267 |
| | | | | 705/14.64 |
| 2014/0279070 | A1 * | 9/2014 | Ramakrishnan | G06Q 30/0277 |
| | | | | 705/14.73 |
| 2015/0178779 | A1 * | 6/2015 | Malone | G06Q 30/0277 |
| | | | | 705/14.58 |
| 2015/0317678 | A1 * | 11/2015 | Huang | G06Q 30/0256 |
| | | | | 705/14.54 |
| 2015/0356620 | A1 | 12/2015 | Gil et al. | |
| 2016/0162939 | A1 * | 6/2016 | Kang | G06Q 30/0267 |
| | | | | 705/14.55 |
| 2016/0350798 | A1 * | 12/2016 | Kornacki | H04L 67/34 |
| 2016/0358230 | A1 * | 12/2016 | Wilson | G06Q 30/0277 |
| 2017/0026444 | A1 * | 1/2017 | Bhat | H04L 67/01 |
| 2017/0068996 | A1 * | 3/2017 | Qin | G06F 8/36 |
| 2017/0236163 | A1 | 8/2017 | Glover | |
| 2019/0361952 | A1 * | 11/2019 | Du | G06F 16/532 |
| 2020/0175549 | A1 * | 6/2020 | Pang | H04N 21/44204 |
| 2020/0344307 | A1 * | 10/2020 | Livshits | H04N 21/812 |
| 2022/0150292 | A1 * | 5/2022 | Mo | G06Q 30/0631 |
| 2023/0096236 | A1 * | 3/2023 | Lidow | G06Q 30/0241 |
| | | | | 705/14.73 |

* cited by examiner

Figure 1:
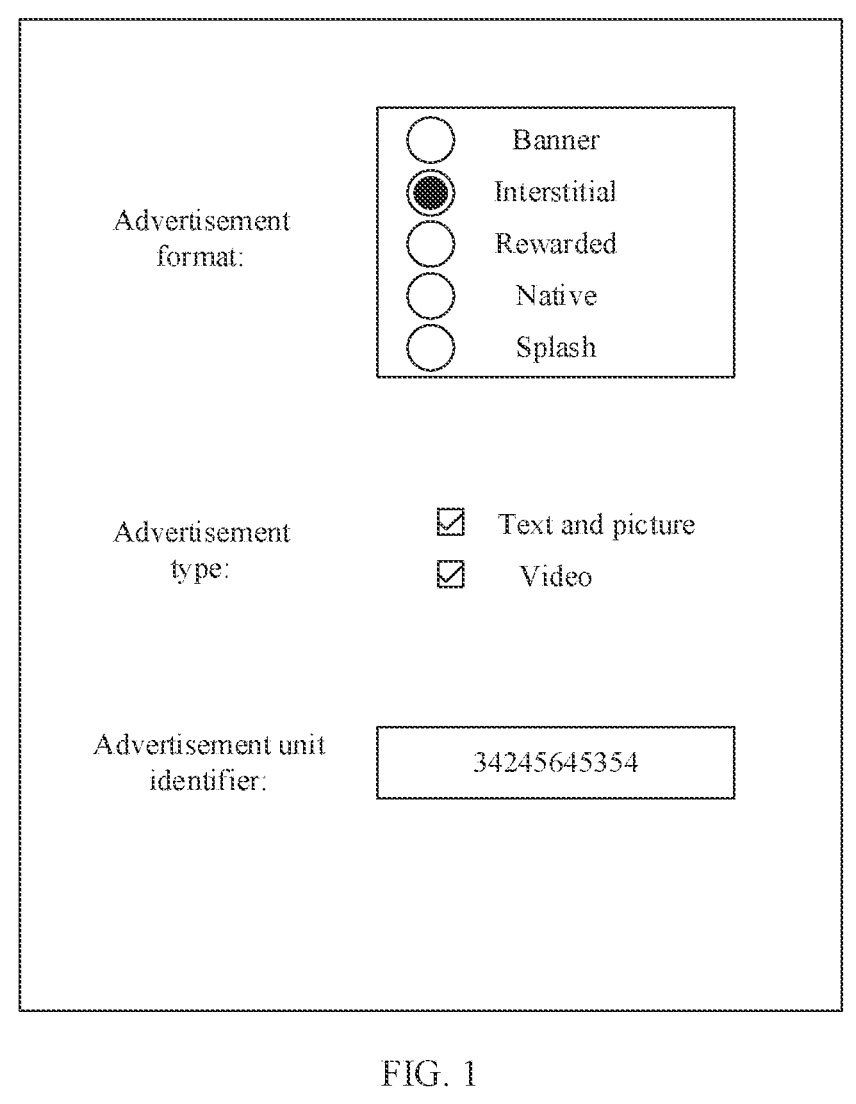

Advertisement
format:

◯ Banner

⬤ Interstitial

◯ Rewarded

◯ Native

◯ Splash

Advertisement
type:

☑ Text and picture

☑ Video

Advertisement unit
identifier:

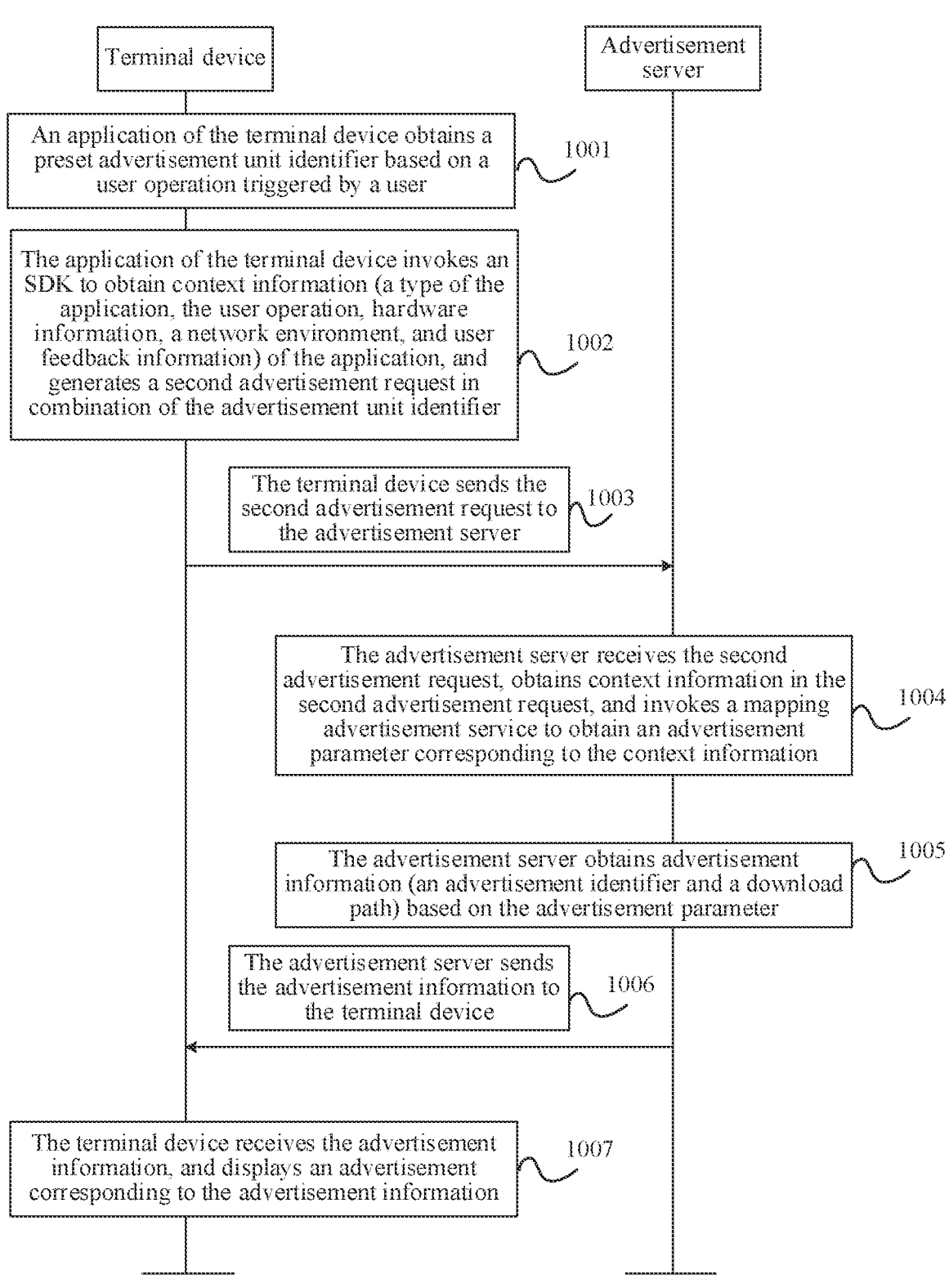

Terminal device                                        Advertisement server

An application of the terminal device obtains a preset advertisement unit identifier based on a user operation triggered by a user    1001

The application of the terminal device invokes an SDK to obtain context information (a type of the application, the user operation, hardware information, a network environment, and user feedback information) of the application, and generates a second advertisement request in combination of the advertisement unit identifier    1002

The terminal device sends the second advertisement request to the advertisement server    1003

The advertisement server receives the second advertisement request, obtains context information in the second advertisement request, and invokes a mapping advertisement service to obtain an advertisement parameter corresponding to the context information    1004

The advertisement server obtains advertisement information (an advertisement identifier and a download path) based on the advertisement parameter    1005

The advertisement server sends the advertisement information to the terminal device    1006

The terminal device receives the advertisement information, and displays an advertisement corresponding to the advertisement information    1007

ADVERTISEMENT DISPLAY SYSTEM AND METHOD

CROSS-REFERENCE TO RELATED APPLICATIONS

This is a U.S. National Stage of International Patent Application No. PCT/CN2022/078014 filed on Feb. 25, 2022, which claims priority to Chinese Patent Application No. 202110224810.5 filed on Mar. 1, 2021. Both of the aforementioned applications are hereby incorporated by reference in their entireties.

TECHNICAL FIELD

This application relates to the field of terminal technologies, and in particular, to an advertisement display system and method.

BACKGROUND

An application (application, APP) advertisement (which is referred to as an advertisement for short below) is an advertisement displayed, by using an application installed on a terminal device, to a user who uses the terminal device.

In a process in which the terminal device runs the application, the application may request, from an advertisement server based on a preset advertisement unit identifier, an advertisement that matches a preset advertisement format and/or an advertisement type. A developer of the application may apply to the advertisement server in advance by using a request interface shown in FIG. 1 based on the preset advertisement format and/or advertisement type, to obtain the advertisement unit identifier.

However, an advertisement format (such as a banner format, an interstitial format, a splash format, a rewarded format, and a native format) and an advertisement type (such as a text, a picture, and a video) of each advertisement displayed by the application are both preset, but a scenario in which the terminal device runs the application constantly changes, resulting in a problem that a matching degree between the advertisement displayed by the application and the current scenario of the terminal device is low.

SUMMARY

This application provides an advertisement display system and method, and resolves a problem in a conventional technology that a matching degree between an advertisement displayed by an application and a current scenario of a terminal device is low.

To achieve the foregoing objective, the following technical solutions are used in this application.

According to a first aspect, an advertisement display system is provided. The advertisement display system includes: an advertisement server and a first terminal device, and the advertisement server is connected to the first terminal device.

The first terminal device detects a first operation of a user, and obtains, in response to the first operation, context information corresponding to a current scenario of the first terminal device.

The first terminal device generates a first advertisement request based on the context information, and sends the first advertisement request to the advertisement server.

The advertisement server receives the first advertisement request sent by the first terminal device, and obtains, based on the first advertisement request, first advertisement information that matches the context information.

The advertisement server sends the first advertisement information to the first terminal device, where the first advertisement information indicates first advertisement content, and the context information is associated with the first advertisement content.

The first terminal device obtains the first advertisement information fed back by the advertisement server, and displays the first advertisement content based on the first advertisement information.

In a first possible implementation of the first aspect, the first advertisement request includes: an advertisement parameter.

That the first terminal device generates a first advertisement request based on the context information includes:

The first terminal device obtains an advertisement parameter corresponding to the context information; and the first terminal device generates the first advertisement request based on the advertisement parameter.

Based on the foregoing first possible implementation of the first aspect, in a second possible implementation of the first aspect, the context information includes: hardware information of the first terminal device, a network environment in which the first terminal device is located, and the first operation. The advertisement parameter includes: an advertisement format, an advertisement type, and an advertisement location.

That the first terminal device obtains an advertisement parameter corresponding to the context information includes:

The first terminal device determines, based on the hardware information and the network environment, an advertisement format and an advertisement type that correspond to the context information; and the first terminal device determines, based on the first operation, an advertisement location corresponding to the context information.

In a third possible implementation of the first aspect, the first advertisement request includes: the context information.

Before the first terminal device generates the first advertisement request based on the context information, the first terminal device obtains an advertisement unit identifier.

That the first terminal device generates a first advertisement request based on the context information includes:

The first terminal device generates the first advertisement request based on the advertisement unit identifier and the context information.

That the advertisement server obtains, based on the first advertisement request, first advertisement information that matches the context information includes:

The advertisement server determines, based on the first advertisement request, an advertisement parameter associated with the context information, and obtains the first advertisement information based on the advertisement parameter.

Based on any one of the foregoing possible implementations of the first aspect, in a fourth possible implementation of the first aspect, before the first terminal device generates the first advertisement request based on the context information, the first terminal device obtains the advertisement unit identifier.

That the first terminal device generates a first advertisement request based on the context information includes:

The first terminal device generates the first advertisement request based on the advertisement unit identifier and the context information.

Based on any one of the foregoing possible implementations of the first aspect, in a fifth possible implementation of the first aspect, the advertisement display system further includes: a second terminal device. The second terminal device is connected to the advertisement server.

The second terminal device uploads the first advertisement content to the advertisement server.

The advertisement server receives the first advertisement content, and allocates an advertisement identifier to the first advertisement content.

Based on the foregoing fifth possible implementation of the first aspect, in a sixth possible implementation of the first aspect, the advertisement server obtains an advertisement parameter corresponding to the first advertisement content.

The advertisement parameter includes an advertisement format, an advertisement type, and an advertisement location of the first advertisement content. The advertisement parameter is obtained by the advertisement server by identifying the first advertisement content. Alternatively, the advertisement parameter is determined by the second terminal device based on an operation triggered by the user, and sent to the advertisement server.

According to a second aspect, an advertisement display method is provided. The method includes:

detecting a first operation of a user;

obtaining, in response to the first operation, context information corresponding to a current scenario of a terminal device;

generating a first advertisement request based on the context information, and sending the first advertisement request to an advertisement server;

obtaining first advertisement information fed back by the advertisement server, where the first advertisement information indicates first advertisement content, and the context information is associated with the first advertisement content; and displaying the first advertisement content based on the first advertisement information.

In a first possible implementation of the second aspect, the first advertisement request includes: an advertisement parameter.

The generating a first advertisement request based on the context information includes:

obtaining an advertisement parameter corresponding to the context information; and generating the first advertisement request based on the advertisement parameter, where the first advertisement request indicates the advertisement server to obtain and send the first advertisement information to the terminal device based on the first advertisement request.

Based on the foregoing first possible implementation of the second aspect, in a second possible implementation of the second aspect, the context information includes: hardware information of the terminal device, a network environment in which the terminal device is located, and the first operation. The advertisement parameter includes: an advertisement format, an advertisement type, and an advertisement location.

The obtaining an advertisement parameter corresponding to the context information includes:

determining, based on the hardware information and the network environment, an advertisement format and an advertisement type that correspond to the context information; and determining, based on the first operation, an advertisement location corresponding to the context information.

Based on any one of the foregoing possible implementations of the second aspect, in a third possible implementation of the second aspect, before the generating a first advertisement request based on the context information, the method further includes:

obtaining an advertisement unit identifier.

The generating a first advertisement request based on the context information includes:

generating the first advertisement request based on the advertisement unit identifier and the context information.

In a fourth possible implementation of the second aspect, the first advertisement request includes: the context information.

Before the generating a first advertisement request based on the context information, the method further includes:

obtaining an advertisement unit identifier.

The generating a first advertisement request based on the context information includes:

generating the first advertisement request based on the advertisement unit identifier and the context information, where the first advertisement request indicates the advertisement server to determine an advertisement parameter associated with the context information, and obtain and send the first advertisement information to the terminal device based on the advertisement parameter.

Based on any one of the foregoing possible implementations of the second aspect, in a fifth possible implementation of the second aspect, after the displaying the first advertisement content based on the advertisement information, the method further includes:

obtaining a second operation triggered by the user for the first advertisement content;

obtaining, in response to the second operation, the context information corresponding to the current scenario of the terminal device, where the context includes user feed back information, and the user feedback information is associated with the second operation;

generating a second advertisement request based on the context information, and sending the second advertisement request to the advertisement server;

obtaining second advertisement information fed back by the advertisement server, where the second advertisement information indicates second advertisement content, and the context information that includes the user feedback information is associated with the second advertisement content; and displaying the second advertisement content based on the second advertisement information.

Based on any one of the foregoing possible implementations of the second aspect, in a sixth possible implementation of the second aspect, the first advertisement information includes: a first advertisement identifier and a first download path.

The displaying the first advertisement content based on the first advertisement information includes:

obtaining, based on the advertisement identifier and the download path in the advertisement information, the first advertisement content associated with the context information; and displaying the first advertisement content.

Based on any one of the foregoing possible implementations of the second aspect, in a seventh possible implementation of the second aspect, the context information includes: the hardware information of the terminal device, the network environment in which the terminal device is located, a type of an application currently run by the terminal device, an application theme corresponding to content currently displayed by the application, a user operation triggered on the terminal device, and the user feedback information.

According to a third aspect, an electronic device is provided, including a processor. The processor is configured to run a computer program stored in a memory, to implement the advertisement display method in any one of the implementations of the second aspect.

According to a fourth aspect, a computer-readable storage medium is provided. The computer-readable storage medium stores a computer program, and when the computer program is executed by a processor, the advertisement display method in any one of the implementations of the second aspect is implemented.

According to the advertisement display system and method provided in this application, an application of the terminal device may obtain a preset advertisement unit identifier based on an operation triggered by the user, invoke an SDK of the application to obtain context information of the application, and then invoke a mapping advertisement service in the SDK to generate, based on an advertisement unit identifier and context information, a first advertisement request including the advertisement unit identifier and an advertisement parameter. Then, the terminal device may send the first advertisement request to the advertisement server. The advertisement server may receive the first advertisement request, search, based on the first advertisement request, for an advertisement corresponding to the first advertisement request, and obtain advertisement information of the advertisement. Then, the advertisement server may feed back the advertisement information corresponding to the advertisement to the terminal device. The terminal device may receive the advertisement information, and display the corresponding advertisement based on the advertisement information. By using an advertisement unit identifier of a dynamic advertisement unit, the terminal device may determine, based on the context information of the application, in other words, based on the current scenario of the terminal device, an advertisement parameter that matches the current scenario, to obtain an advertisement that matches the current scenario, and display the obtained advertisement based on the advertisement parameter, so that a matching degree and a fitting degree between the advertisement and the current scenario can be improved, and a click-through rate and a conversion rate of the advertisement can be further improved.

BRIEF DESCRIPTION OF DRAWINGS

FIG. 1 is a schematic diagram of a request interface in a conventional technology;

FIG. 10 is a schematic flowchart of another advertisement display method according to an embodiment of this application;

DESCRIPTION OF EMBODIMENTS

Figure 2:
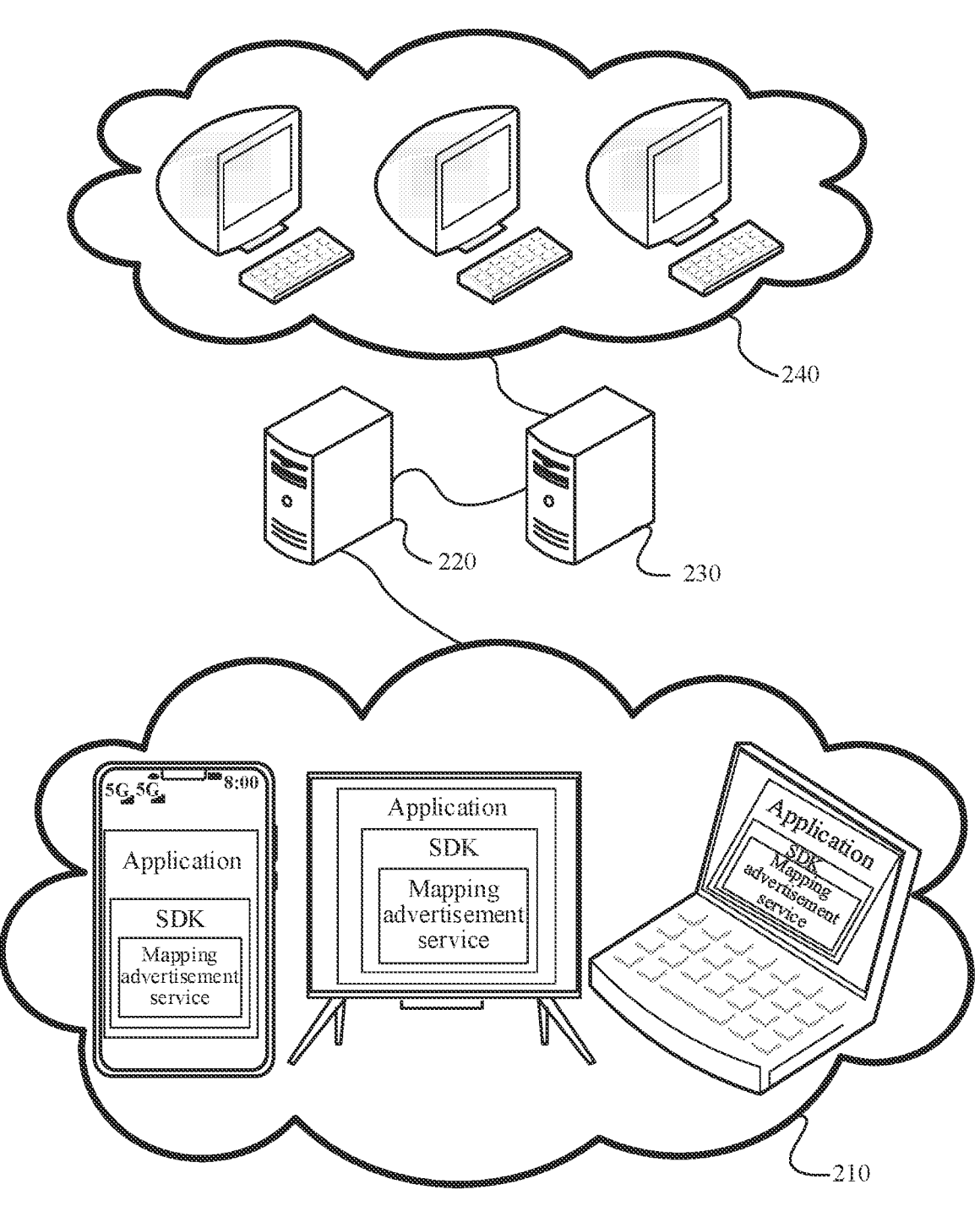
FIG. 2 is a diagram of a system architecture of an advertisement display system related to an advertisement display method according to an embodiment of this application.

First, an advertisement display system related to an advertisement display method provided in an embodiment of this application is described. Refer to FIG. 2. An advertisement display system shown in FIG. 2 may include at least one first terminal device 210, an advertisement server 220, an advertisement platform 230, and at least one second terminal device 240.

The advertisement server 220 and the advertisement platform 230 may be separately located in different hardware devices, or may be integrated into a same hardware device. This is not limited in this embodiment of this application. If the advertisement server 220 and the advertisement platform 230 may be separately located in different hardware devices, the advertisement server 220 is connected to each first terminal device 210, the advertisement server 220 is further connected to the advertisement platform 230, and the advertisement platform 230 is connected to each second terminal device 240. If the advertisement server 220 and the advertisement platform 230 are integrated into a same hardware device, each first terminal device 210 is connected to the advertisement server 220 and the advertisement platform 230, and each second terminal device 240 is also connected to the advertisement server 220 and the advertisement platform 230.

In addition, the at least one first terminal device 210 may include a mobile phone, a television, a computer, and the like. The first terminal device 210 is not limited in this embodiment of this application.

That the advertisement server 220 and the advertisement platform 230 may be separately located in different hardware devices is used for description below.

The first terminal device 210 may install an application. An advertisement unit is preset in the application. The advertisement unit may include an advertisement unit identifier, and the advertisement unit identifier is for requesting an advertisement from the advertisement server 220. In addition, the application may further include a software development kit (software development kit, SDK) provided by an advertisement alliance, and the SDK may include a mapping advertisement service.

The SDK is for obtaining context information of the application. The mapping advertisement service is for determining, based on the context information of the application, an advertisement parameter corresponding to a current scenario. The advertisement parameter may include an advertisement format, an advertisement type, and an advertisement location, so that the application may generate a first advertisement request based on the determined advertisement parameter and in combination of the advertisement unit identifier.

In addition, the context information of the application may include: a type of the application, a user operation triggered by a user on an interface corresponding to the application, hardware information of the first terminal device 210, a network environment in which the first terminal device 210 is currently located, and user feedback information. The user feedback information is information that is recorded by the first terminal device 210 and that is fed back by the user for a displayed advertisement. In addition, the application may display different advertisements based on different context information, and the recorded user feedback information may also correspond to the different advertisements.

The advertisement server 220 may include a large quantity of advertisements uploaded by the advertisement platform 230. The advertisement server 220 may search, based on the first advertisement request sent by the first terminal device 210, the large quantity of advertisements for an advertisement that matches the first advertisement request, and feed back advertisement information corresponding to the advertisement to the first terminal device 210, so that the first terminal device 210 may display to the user based on the advertisement information, the advertisement corresponding to the context information of the application. The advertisement information may include an advertisement identifier and a download path that correspond to the advertisement, so that the first terminal device 210 may obtain and display the advertisement based on the advertisement identifier and the download path.

The advertisement platform 230 may receive in advance advertisement content uploaded by an advertiser by using the second terminal device 240. (where an advertisement material or an advertisement may also be used to represent the advertisement content in the following), and forward each advertisement material to the advertisement server 220.

In addition, the advertisement platform 230 may further send information such as an advertisement format, an advertisement type, and an advertisement identifier that correspond to each advertisement material to the advertisement server 220, so that the advertisement server 220 may store, while storing each advertisement material, the information such as the advertisement format, the advertisement type, and the advertisement identifier that correspond to each advertisement material.

Figure 3:
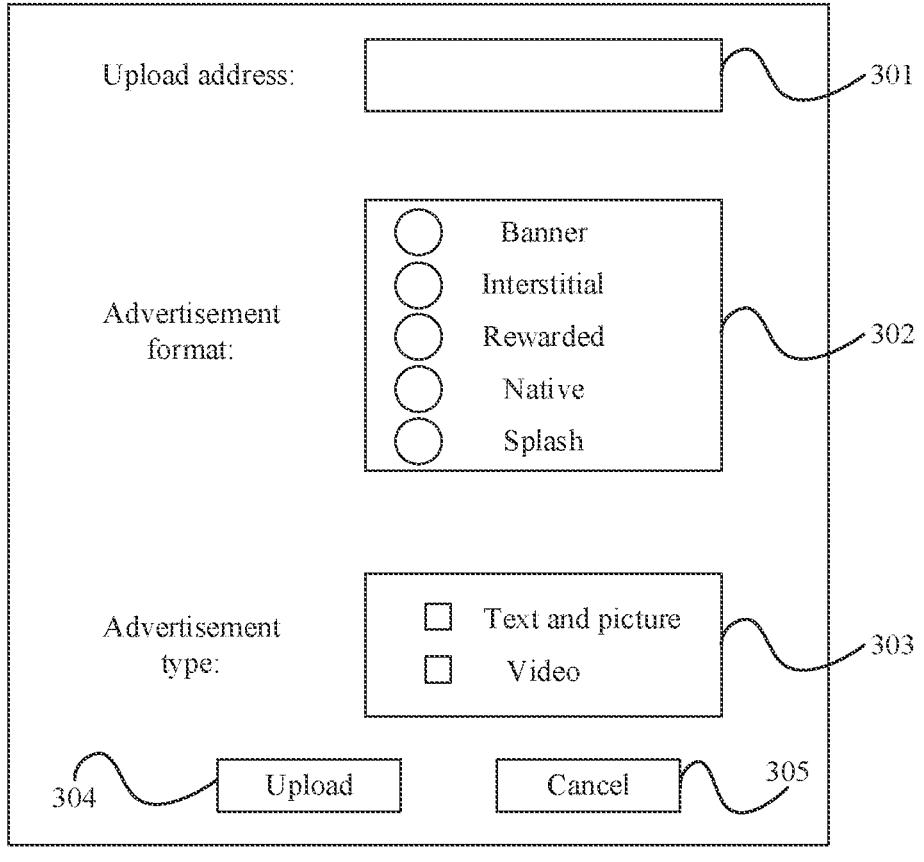
FIG. 3 is a schematic diagram of an uploading interface according to an embodiment of this application.

It should be noted that, in a process in which the advertiser uploads the advertisement material by using the second terminal device 240, the second terminal device 240 may display an uploading interface shown in FIG. 3 to the advertiser. FIG. 3 is a schematic diagram of an uploading interface. The uploading interface may include: an uploading address bar 301, an advertisement format bar 302, an advertisement type bar 303, an uploading option 304, and a cancellation option 305. The second terminal device 240 may fill, based on information input by the advertiser, a storage path corresponding to the advertisement material in the uploading address bar 301. The second terminal device 240 may also select, based on an operation triggered by the advertiser in the advertisement format bar 302, an advertisement format for displaying the advertisement material from a plurality of formats that correspond to the advertisement format bar 302, such as a banner format, an interstitial format, a rewarded format, a native format, and a splash format. The second terminal device 240 may further select, based on an operation triggered by the advertiser in the advertisement type bar 303, an advertisement type corresponding to the advertisement material from different types corresponding to the advertisement type bar 303, such as a video, a picture, and a text. If the second terminal device 240 detects an operation triggered by the advertiser on the uploading option 304, the second terminal device 240 may upload the advertisement material, and the advertisement format and the advertisement type that correspond to the advertisement material to the advertisement platform 240. Correspondingly, the advertisement platform 240 may allocate an advertisement identifier to each advertisement material, to uniquely identify the advertisement material. However, if the second terminal device 240 detects an operation triggered by the advertiser on the cancellation option 305, the second terminal device 240 cancels uploading of the advertisement material, and the advertisement format and the advertisement type that correspond to the advertisement material to the advertisement platform 240.

Figure 4:
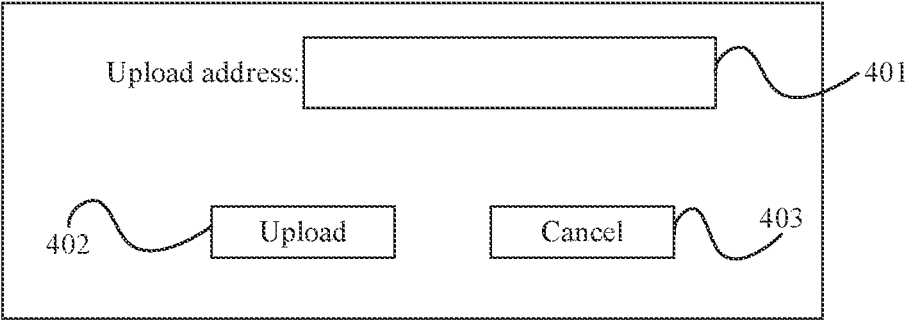
FIG. 4 is a schematic diagram of another uploading interface according to an embodiment of this application.

Certainly, the second terminal device 240 may alternatively display an uploading interface shown in FIG. 4 to the advertiser. FIG. 4 is a schematic diagram of another uploading interface. The uploading interface may include: an uploading address bar 401, an uploading option 402, and a cancellation option 403. The second terminal device 240 may fill, based on information input by the advertiser, a storage path corresponding to the advertisement material in the uploading address bar 401. If the second terminal device 240 detects an operation triggered by the advertiser on the uploading option 402, the second terminal device 240 may upload the advertisement material to the advertisement platform 240. Correspondingly, the advertisement platform 240 may not only allocate an advertisement identifier to each advertisement material, but also analyze the advertisement material, to determine an advertisement format and an advertisement type that correspond to the advertisement material. The advertiser only needs to upload the advertisement material, and does not need to set information such as the advertisement format and the advertisement type, so that a step in which the advertiser uploads the advertisement material to the advertisement platform 230 can be simplified, and efficiency of uploading the advertisement material is improved. However, if the second terminal device 240 detects an operation triggered by the advertiser on the cancellation option 403, the second terminal device 240 cancels uploading of the advertisement material to the advertisement platform 240.

For example, the advertisement platform 230 may receive an advertisement material uploaded by the advertiser. If the advertisement material uploaded by the advertiser is video data, the advertisement platform 230 may determine that an advertisement type of the advertisement material is a video. In addition, the advertisement platform 230 may further analyze the video data, determine a resolution of the video data, and determine, based on the resolution of the video data, that an advertisement format of the advertisement material is a banner format, an interstitial format, a splash format, a rewarded format, or a native format.

In addition, when determining the advertisement format corresponding to the advertisement material based on the operation triggered by the user, the second terminal device 240 may further provide the user with a plurality of location options. The second terminal device 240 may obtain an advertisement location based on an operation triggered by the user on any location option, that is, determine a location for displaying the advertisement material. Certainly, during actual application, the second terminal device 240 may obtain the advertisement location based on the operation triggered by the user. If no operation triggered by the user on the location option is detected, the second terminal device 240 may not obtain the advertisement location. This is not limited in this embodiment of this application.

After the second terminal device 240 uploads the advertisement material to the advertisement platform 230, the advertisement platform 230 may allocate the advertisement identifier to the advertisement material, to uniquely identify the advertisement material. The advertisement platform 230 may further send the advertisement material to the advertisement server 220, and may further send, to the advertisement server 220, an advertisement parameter and the advertisement identifier that correspond to each advertisement material, so that the advertisement server 220 can feed back an advertisement to the first terminal device 210.

Correspondingly, in a process in which the first terminal device 210 runs an application, if application logic of the application detects that an advertisement can be displayed in a current scenario, the application may obtain an advertisement unit identifier, and invoke an SDK to obtain context information of the application. Then, the application may determine, by using a mapping advertisement service and in combination of the context information of the application, an advertisement parameter corresponding to the current scenario, to be specific, determine an advertisement format, an advertisement type, and an advertisement location that correspond to the current scenario. The application may generate a first advertisement request based on the advertisement parameter and in combination of the advertisement unit identifier. The first terminal device 210 may send the first advertisement request to the advertisement server 220.

The advertisement unit identifier may be preset in the application. In other words, the advertisement unit identifier is preset when the application is developed. Certainly, the advertisement unit identifier may alternatively be obtained by the first terminal device 210 by requesting from the advertisement server 220. This is not limited in this embodiment of this application.

Figure 5:
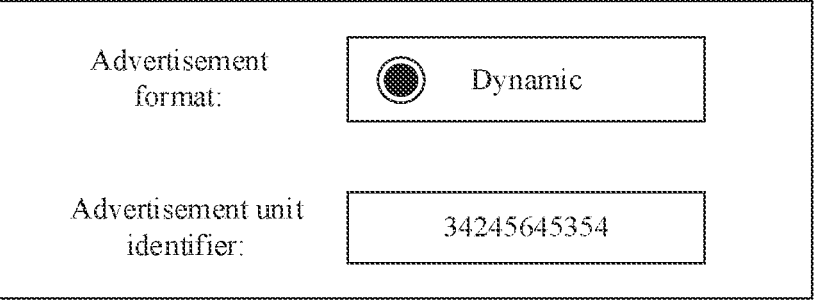
FIG. 5 is a schematic diagram of a request interface according to an embodiment of this application.

Further, the advertisement unit identifier preset by the application is also obtained by the first terminal device 210 by requesting from the advertisement server 220. For example, refer to FIG. 5. FIG. 5 shows a request interface on which the first terminal device 210 requests the advertisement unit identifier from the advertisement server 220. The first terminal device 210 may select an advertisement format as a dynamic advertisement format based on an operation triggered by a user, without the user filling in other information. The first terminal device 210 may request the advertisement unit identifier from the advertisement server 220, and based on information fed back by the advertisement server 220, display the advertisement unit identifier in the dynamic advertisement format on the request interface.

After the first terminal device 210 sends the first advertisement request to the advertisement server 220, the advertisement server 220 may analyze the first advertisement request to obtain the advertisement unit identifier and the advertisement parameter that are included in the first advertisement request. Then the advertisement platform may search based on the advertisement unit identifier and the advertisement parameter, and determine a matched advertisement. The advertisement server 220 may send advertisement information corresponding to the matched advertisement to the first terminal device 210. The first terminal device 210 may receive the advertisement information, and display, based on the advertisement information, the advertisement on an interface corresponding to the application.

It should be noted that, in the foregoing advertisement display system, an example in which the mapping advertisement service is located in the SDK of the application is used for description. However, during actual application, the mapping advertisement service may alternatively be located in the advertisement server 220, and the mapping advertisement service may alternatively be a system service of the first terminal device 210. This is not limited in this embodiment of this application.

For example, if the mapping advertisement service is located in the advertisement server 220, after obtaining the advertisement unit identifier and the context information, the application of the first terminal device 210 may generate a second advertisement request, and send the second advertisement request to the advertisement server 220. After receiving the second advertisement request, the advertisement server 220 may determine the advertisement parameter by using the mapping advertisement service and in combination of the context information in the second advertisement request. Then, the advertisement server 220 may obtain the advertisement information based on the determined advertisement parameter. This process is similar to a process of obtaining the advertisement information in the advertisement display system shown in FIG. 2, and details are not described herein again.

Alternatively, the mapping advertisement service is located in the first terminal device 210, and the mapping advertisement service may serve as the system service or a function of the first terminal device 210. Correspondingly, after obtaining the advertisement unit identifier and the context information, the application of the first terminal device 210 may generate a third advertisement request. The application may determine the advertisement parameter by invoking an interface corresponding to the mapping advertisement service, by using the mapping advertisement service of the terminal device, and in combination of the context information in the third advertisement request, and generate a fourth advertisement request in combination of the advertisement unit identifier. Then, the first terminal device 210 may send the fourth advertisement request to the advertisement server 220. A process in which the advertisement server 220 obtains the advertisement information based on the fourth advertisement request is similar to a process of obtaining the advertisement information in the advertisement display system shown in FIG. 2, and details are not described herein again.

It should be noted that, the foregoing advertisement display system may be applied to different scenarios. For example, the advertisement display system may be applied to a scenario of watching a video, or may be applied to a scenario of reading a novel, or may be applied to a scenario of playing a game, or may be applied to a scenario of reading news, or may be applied to a scenario corresponding to other applications (for example, applications of a shopping type, a social type, a wealth-management type and a travel type). This is not limited in this embodiment of this application.

Figure 6:
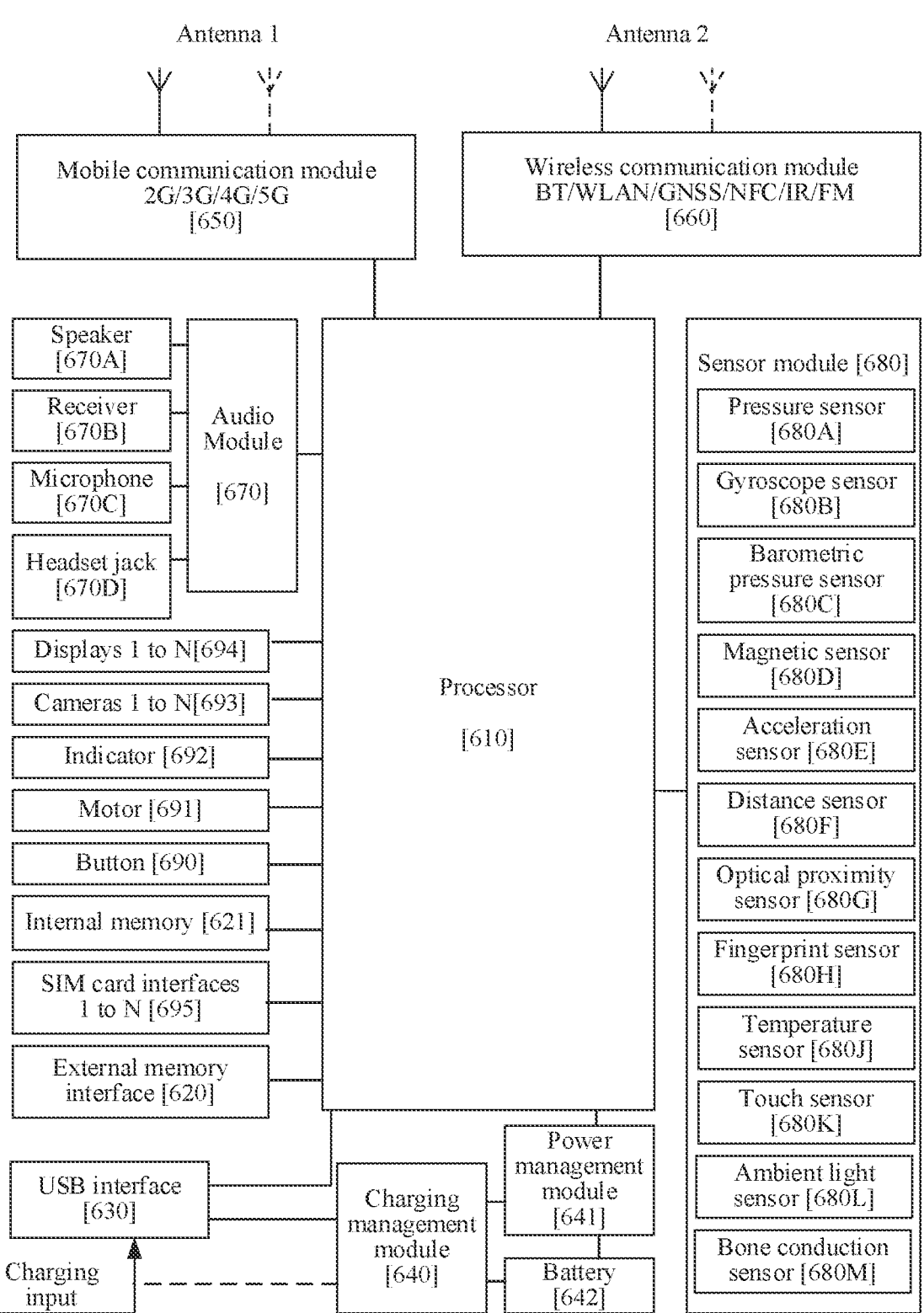
FIG. 6 is a schematic diagram of a structure of a terminal device according to an embodiment of this application.

The following describes the terminal device by using an example in which the terminal device is the mobile phone. Refer to FIG. 6. FIG. 6 is a schematic diagram of a structure of a terminal device according to an embodiment of this application.

The terminal device may include a processor 610, an external memory interface 620, an internal memory 621, a universal serial bus (universal serial bus, US B) interface 630, a charging management module 640, a power management module 641, a battery 642, an antenna 1, an antenna 2, a mobile communication module 650, a wireless communication module 660, an audio module 670, a speaker 670A, a receiver 670B, a microphone 670C, a headset interface 670D, a sensor module 680, a button 690, a motor 691, an indicator 692, a camera 693, and a display 694, a subscriber identification module (SIM) card interface 695, and the like. The sensor module 680 may include a pressure sensor 680A, a gyroscope sensor 680B, a barometric pressure sensor 680C, a magnetic sensor 680D, an acceleration sensor 680E, a distance sensor 680F, an optical proximity sensor 680G, a fingerprint sensor 6801H, a temperature sensor 680J, a touch sensor 680K, an ambient light sensor 680L, a bone conduction sensor 680M, and the like.

It may be understood that the structure shown in this embodiment of the present invention does not constitute a specific limitation on the terminal device. In some other embodiments of this application, the terminal device may include more or fewer components than those shown in the figure, or combine some components, or split some components, or have different component arrangements. The components shown in the figure may be implemented in hardware, software, or a combination of software and hardware.

The processor 610 may include one or more processing units. For example, the processor 610 may include an application processor (application processor, AP), a modem processor, a graphics processing unit (graphics processing unit, GPU), an image signal processor (image signal processor. ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal device. The controller may generate an operation control signal based on instruction operation code and a time sequence signal, and complete control of instruction fetching and instruction execution.

The processor 610 may further be provided with a memory configured to store instructions and data. In some embodiments, the memory in the processor 610 is a cache memory. The memory may store instructions or data that is just used or cyclically used by the processor 610. If the processor 610 needs to use the instructions or the data again, the instructions or the data may be directly invoked from the memory, so that repeated access is avoided, waiting time of the processor 610 is reduced, therefore system efficiency is improved.

In some embodiments, the processor 610 may include one or more interfaces. The interface may include an integrated circuit (integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (MIPI), a general-purpose input/output (GPIO) interface, a subscriber identity module (SIM) interface, a universal serial bus (universal serial bus), USB port, and/or the like.

The MIPI interface may be configured to connect the processor 610 to peripheral components such as the display 694 and the camera 693. The MIPI interface includes a camera serial interface (camera serial interface. CSI), a display serial interface (display serial interface, DSI), and the like. In some embodiments, the processor 610 and the camera 693 communicate with each other by using a CST interface, to implement a photographing function of the terminal device. The processor 610 communicates with the display 694 by using a DSI interface, to implement a display function of the terminal device.

The GPIO interface can be arranged by using software. The GPIO interface can be arranged as a control signal or a data signal. In some embodiments, the GPIO interface may be configured to connect the processor 610 to the camera 693, the display 694, the wireless communication module 660, the audio module 670, the sensor module 680, and the like. The GPIO interface can also be arranged as an I2C interface, an I2S interface, a UART interface, an MIPI interface, and the like.

It may be understood that interface connection relationships between modules shown in this embodiment of the present invention is merely an example for description, and does not constitute a limitation on the structure of the terminal device. In some other embodiments of this application, the terminal device may alternatively use different interface connection manners or a combination of a plurality of interface connection manners in the foregoing embodiment.

The power management module 641 is configured to connect the battery 642, the charging management module 640, and the processor 610. The power management module 641 receives input from the battery 642 and/or the charging management module 640, and supplies power to the processor 610, the internal memory 621, the external memory, the display 694, the camera 693, the wireless communication module 660, and the like. The power management module 641 may be further configured to monitor parameters such as a battery capacity, a battery cycle count, and a battery state of health (leakage and impedance). In some other embodiments, the power management module 641 may alternatively be disposed in the processor 610. In some other embodiments, the power management module 641 and the charging management module 640 may alternatively be disposed in a same component.

A wireless communication function of the terminal device may be implemented by using the antenna 1, the antenna 2, the mobile communication module 650, the wireless communication module 660, the modem processor, the baseband processor, and the like.

The antenna 1 and the antenna 2 are configured to transmit and receive an electromagnetic wave signal. Each antenna in the terminal device may be configured to cover one or more communication bands. Different antennas may also be multiplexed to improve antenna utilization. For example, the antenna 1 may be multiplexed as a diversity antenna of a wireless local area network. In some other embodiments, the antenna may be used in conjunction with a tuning switch.

The wireless communication module 660 may provide a solution, applied to the terminal device, of wireless communication including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), infrared technique (infrared, IR), and the like. The wireless communication module 660 may be one or more components that integrate at least one communication processing module. The wireless communication module 660 receives the electromagnetic wave by using the antenna 2, performs frequency modulation and filtering processing on the electromagnetic wave signal, and sends a processed signal to the processor 610. The wireless communication module 660 may further receive a to-be-sent signal from the processor 610, perform frequency modulation and amplification on the signal, and convert the signal into an electromagnetic wave by using the antenna 2.

In some embodiments, the antenna 1 of the terminal device is coupled to the mobile communication module 650, and the antenna 2 is coupled to the wireless communication module 660, so that the terminal device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technique, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS) and/or a satellite based augmentation system (satellite based augmentation system SBEAS).

The terminal device implements a display function by using a GPU, the display 694, an application processor, and the like. The GPU is an image processing microprocessor, and is connected to the display 694 and the application processor. The GPU is configured to perform mathematical and geometric calculations for graphics rendering. The processor 610 may include one or more GPLs, and execute program instructions to generate or alter display information.

The display 694 is configured to display an image, a video, and the like. The display 694 includes a display panel. The display panel may use a liquid crystal display (liquid crystal display, LCD), an organic light-emitting diode (or-ganic light-emitting diode, OLED), an active-matrix organic light-emitting diode (active-matrix organic light-emitting diode, AMOLD), a flexible light-emitting diode (flexible light-emitting diode, FLED), Miniled, MicroLed, Micro-oLed, a quantum dot light-emitting diode (quantum dot light emitting diodes, QLED), and the like. In some embodiments, the terminal device may include one or N displays 694, where N is a positive integer greater than 1.

The terminal device may implement a photographing function by using the ISP, the camera 693, the video codec, the CPU, the display 694, the application processor, and the like.

The digital signal processor is configured to process a digital signal, and may process another digital signal in addition to a digital image signal. For example, when the terminal device selects a frequency, the digital signal processor is configured to perform Fourier transform and the like on frequency energy.

The video codec is configured to compress or decompress a digital video. The terminal device may support one or more video codecs. In this way, the terminal device may play or record videos in a plurality of encoding formats, for example, moving picture experts group (moving picture experts group, MPEG) 1, MPEG2, MPEG3, and MPEG4.

An NPU is a neural-network (neural-network, NN) computing processor. By referring to a structure of a biological neural network, for example, by referring to a transmission mode between human brain neurons, the NPU quickly processes input information, and may further continuously perform self-learning. An application such as intelligent cognition of the terminal device may be implemented by using the NPU, for example, image recognition, facial recognition, speech recognition, and text understanding.

The internal memory 621 may be configured to store computer-executable program code, and the executable program code includes instructions. The processor 610 performs various function applications and data processing of the terminal device by running the instructions stored in the internal memory 621. The internal memory 621 may include a program storage area and a data storage area. The program storage area may store an operating system, an application required by at least one function (such as a sound playing function and an image playing function), and the like. The data storage area may store data (such as audio data and a phone book) created in a process of using the terminal device. In addition, the internal memory 621 may include a high-speed random access memory, and may further include a non-volatile memory, for example, at least one of a magnetic disk storage component, a flash memory component, and a universal flash storage (universal flash storage, UFS).

The terminal device may implement, by using the audio module 670, the speaker 670A, the receiver 670B, the microphone 670C, the headset interface 670D, the application processor, and the like, an audio function, for example, music playing and recording.

The pressure sensor 680A is configured to sense a pressure signal, and may convert the pressure signal into an electrical signal. In some embodiments, the pressure sensor 680A may be disposed on the display 694. There are many types of pressure sensors 680A, such as a resistive pressure sensor, an inductive pressure sensor, and a capacitive pressure sensor. The capacitive pressure sensor may include at least two parallel plates having an electrically conductive material. When a force is applied to the pressure sensor 680A, a capacitance between electrodes changes. The terminal device determines intensity of the pressure based on a change of the capacitance. When a touch operation is performed on the display 694, the terminal device detects intensity of the touch operation based on the pressure sensor 680A. Alternatively, the terminal device may calculate a touch location based on a detection signal of the pressure sensor 680A. In some embodiments, touch operations that are performed at a same touch location but have different touch operation intensities may correspond to different operation instructions. For example, when a touch operation whose touch operation intensity is less than a first pressure threshold is applied to a short message application icon, an instruction for viewing a short message is executed. When a touch operation whose touch operation intensity is greater than or equal to the first pressure threshold is applied to the short message application icon, an instruction for creating the short message is executed.

The gyroscope sensor 680B may be configured to determine a motion posture of the terminal device. In some embodiments, angular velocities of the terminal device around three axes (to be specific, an x axis, a v axis, and a z axis) may be determined by using the gyroscope sensor 680B. The gyroscope sensor 680B may be for image stabilization. For example, when a shutter is pressed, the gyroscope sensor 680B detects an angle of shaking of the terminal device, and calculates, based on the angle, a distance that needs to be compensated by a lens module, so that the lens cancels the shaking of the terminal device by reverse motion, to implement the image stabilization. The gyroscope sensor 680B can alternatively be for a scenario such as navigation, and a motion-sensing game.

The acceleration sensor 680E may detect magnitudes of accelerations of the terminal device in all directions (generally the three axes). When the terminal device is stationary, a magnitude and a direction of gravity may be detected. The acceleration sensor 680E may alternatively be configured to identify a posture of the terminal device, and is applied to applications such as landscape/portrait switching, and a pedometer.

The fingerprint sensor 6801H is configured to collect a fingerprint. The terminal device may implement, by using a feature of a collected fingerprint, fingerprint unlock, application lock access, fingerprint photographing, incoming call answering, and the like.

The touch sensor 680K, also referred to as a "touch panel". The touch sensor 680K may be disposed on the display 694. The touch sensor 680K and the display 694 form a touchscreen, which is also referred to as a "touch control screen". The touch sensor 680K is configured to detect a touch operation acting on or near the touch sensor 680K. The touch sensor may transfer the detected touch operation to the application processor, to determine a touch event type. Visual output associated with the touch operation may be provided by using the display 694. In some other embodiments, the touch sensor 680K may alternatively be disposed on a surface of the terminal device, and is different from a location of the display 694.

A software system of the terminal device may use a layered architecture, an event-driven architecture, a micro-kernel architecture, a microservice architecture, or a cloud architecture. In embodiments of the present invention, an Android system with the layered architecture is used as an example to describe a software structure of an electronic device.

Figure 7:
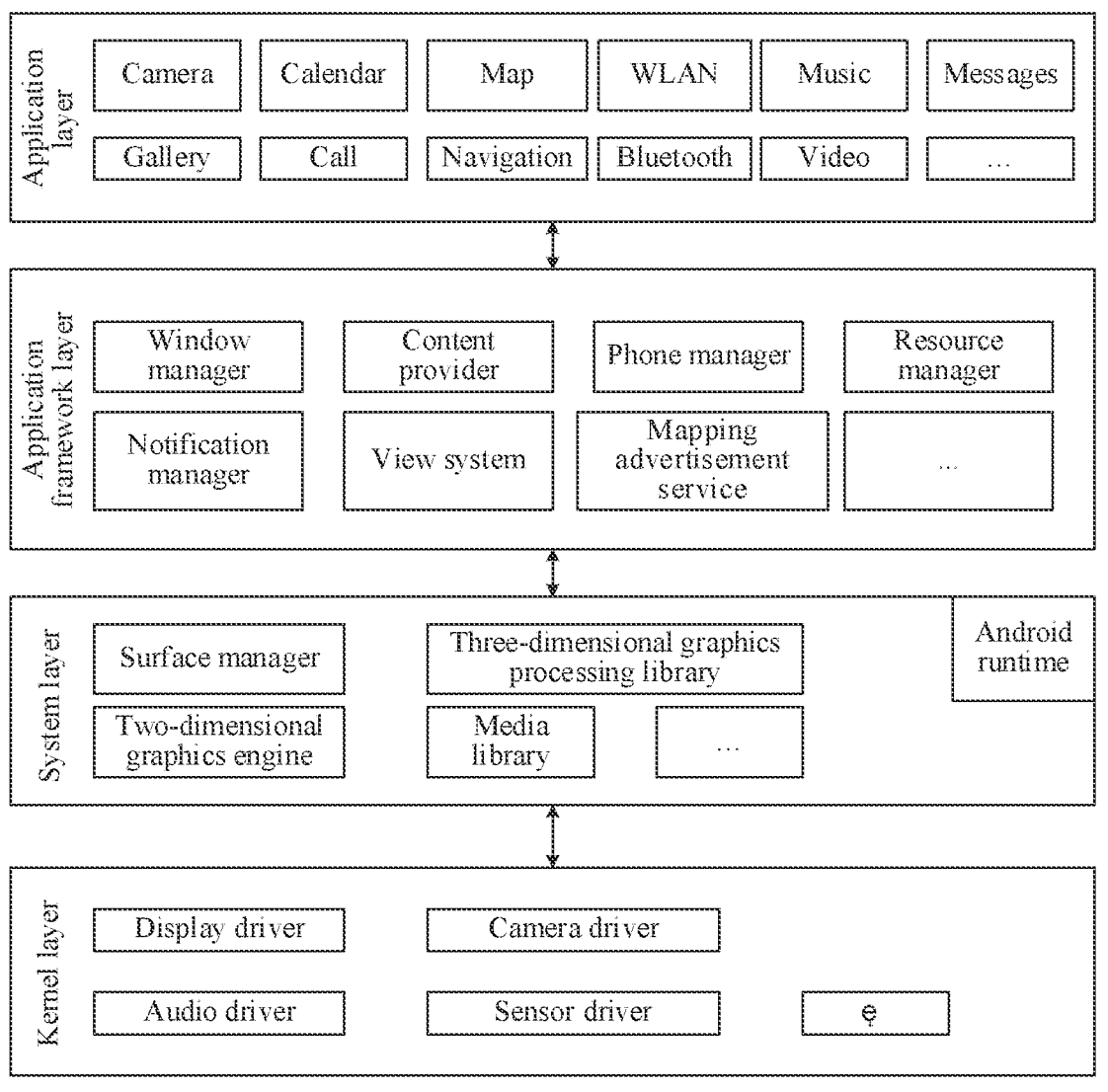
FIG. 7 is a block diagram of a software structure of a terminal device according to an embodiment of this application.

FIG. 7 is a block diagram of a software structure of a terminal device according to an embodiment of this application.

A layered architecture divides software into several layers, each with a clear role and responsibility. The layers communicate with each other by using software interfaces. In some embodiments, an Android system is divided into four layers, from top to bottom respectively: an application layer, an application framework layer, Android runtime (Android runtime) and a system library, and a kernel layer.

The application layer may include a series of application packages.

As shown in FIG. 7, application packages may include applications such as Camera, Gallery, Calendar, Call, Map, Navigation, WLAN, Bluetooth, Music, Video, and Messages. For example, an application may include an SDK, and if a mapping advertisement service is located in the application, the mapping advertisement service is located in the SDK.

The application framework layer provides an application programing interface (API) and a programming framework for the application at the application layer. The application framework layer includes some predefined functions.

As shown in FIG. 7, the application framework layer may include a window manager, a content provider, a view system, a phone manager, a resource manager, a notification manager, and the like. If the mapping advertisement service is a system service of the terminal device, the application framework layer may further include the foregoing mapping advertisement service.

The window manager is for managing a window program. The window manager can obtain a size of a display, determine whether there is a status bar, lock a screen, and capture the screen.

The content provider is for storing and retrieving data and makes these data accessible to the application. The data may include a video, an image, an audio, calls made and received, a browsing history and a bookmark, a phone book, and the like.

The view system includes visual controls, for example, a control for displaying a text, and a control for displaying a picture. The view system is for building the application. The display interface may include one or more views. For example, a display interface including an SMS notification icon may include a view for displaying the text and a view for displaying the picture.

The phone manager is for providing a communication function of the electronic device, for example, call status management (including call connection, hang-up, and the like)

The resource manager provides various resources for the application, such as a localized string, an icon, the picture, a layout file, and a video file.

The notification manager enables the application to display a notification message in the status bar, to be used for conveying a notification-type message, and to disappear automatically after a short pause without user interaction. For example, the notification manager is for notifying download completion, message notification, and the like. The notification manager may be a notification that appears on the status bar on a top of the system in a form of a chart or a scrollbar text, for example, a notification of an application running in a background, or may be a notification that appears on the screen in a form of a dialog window, for example, a notification that a text message is displayed in the status bar, a prompt tone is generated, the electronic device vibrates, and an indicator light blinks.

The Android Runtime includes a core library and a virtual machine. The Android Runtime schedules and manages the Android system.

The core library consists of two parts: the one part is a performance function that java language needs to invoke, and the other part is the core library of Android.

The application layer and the application framework layer run in the virtual machine. The virtual machine executes java files of the application layer and the application framework layer as binary files. The virtual machine is for performing functions such as object life cycle management, stack management, thread management, security and exception management, and garbage collection.

The system library may include a plurality of function modules, such as a surface manager (surface manager), a media library (media library), a three-dimensional graphics processing library (for example, OpenGL ES), and a two-dimensional graphics engine (for example, SGL).

The surface manager is for managing a display subsystem and provides a blend of 2D and 3D layers for a plurality of applications.

The media library supports playing and recording of a plurality of common audio and video formats, a still image file, and the like. The media library supports a plurality of audio and video encoding formats, such as: MPEG4, H.264, MP3, AAC, AMR, JPG, PNG.

The three-dimensional graphics processing library is for realizing three-dimensional graphics drawing, image rendering and synthesis, layer processing, and the like.

The two-dimensional graphics engine is a drawing engine for 2D drawing.

The kernel layer is a layer between hardware and software. The kernel layer includes at least a display driver, a camera driver an audio driver, and a sensor driver.

Based on that an advertisement display system is in a video-watching scenario, and based on that a mapping advertisement service is a system service of a terminal device, the following describes a working process of terminal device software and hardware by using an example.

When the terminal device runs a video application, a virtual machine may determine, based on application logic of the video application, whether an advertisement needs to be displayed currently. If the advertisement needs to be displayed currently, the virtual machine may obtain an advertisement unit identifier, and invoke an SDK in an application package to obtain context information. Then, the virtual machine may invoke a mapping advertisement service on an application framework layer, and determine, by using the mapping advertisement service, an advertisement parameter that matches the context information, to generate a first advertisement request based on the determined advertisement parameter and in combination of the advertisement unit identifier.

The following is described by using an example in which the mapping advertisement service is located in the SDK.

Figure 8:
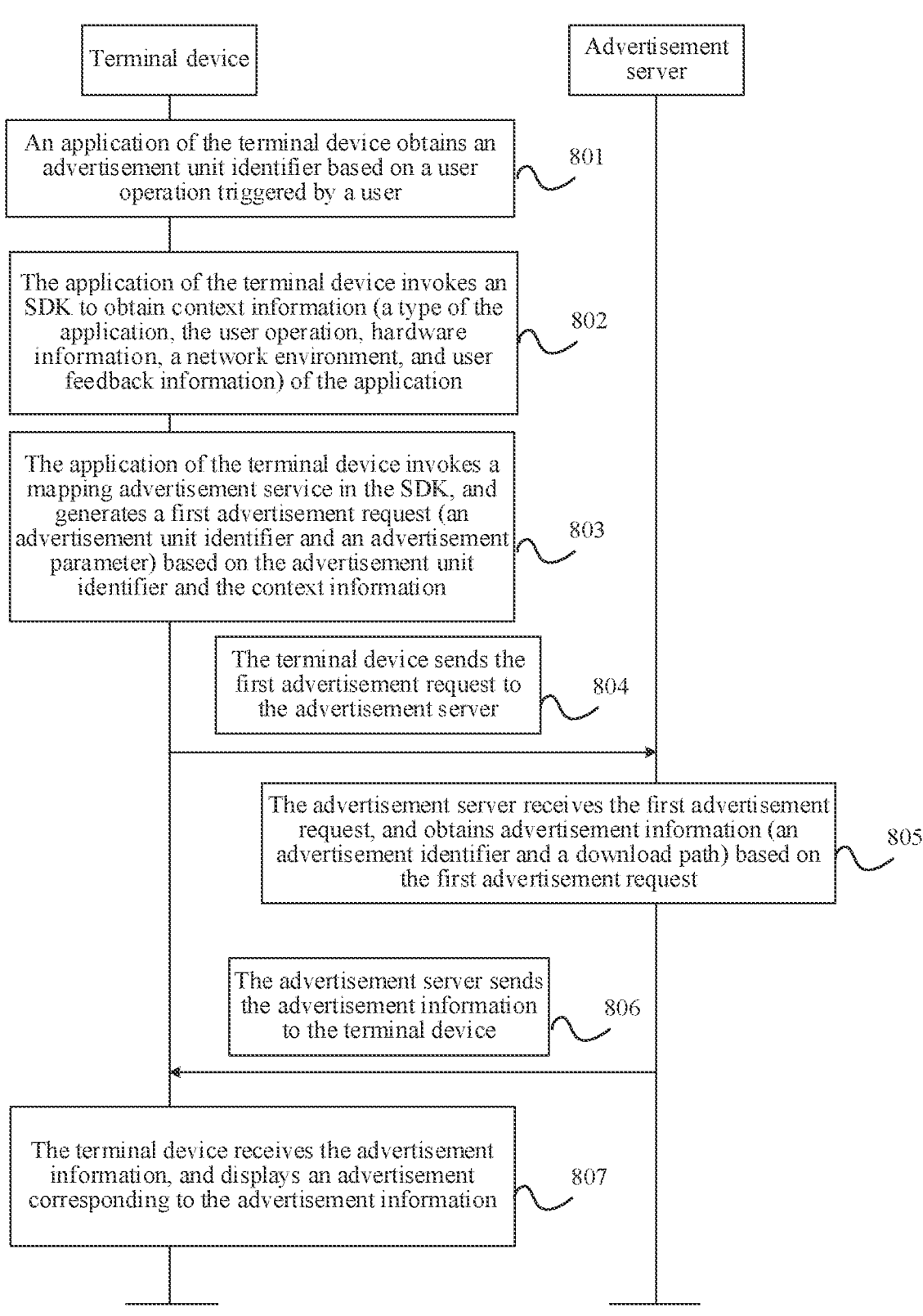
FIG. 8 is a schematic flowchart of an advertisement display method according to an embodiment of this application.

FIG. 8 is a schematic flowchart of an advertisement display method according to an embodiment of this application. By way of example, and not limitation, the method may be interactively applied to the foregoing first terminal device and advertisement server. A terminal device represents the first terminal device below. Refer to FIG. 8. The method includes the following steps.

Step 801: An application of a terminal device obtains an advertisement unit identifier based on a user operation triggered by a user.

The user operation may be a tap operation, a sliding operation, a dragging operation, or the like. This is not limited in this embodiment of this application. For example, when the terminal device detects that the user triggers a tap operation on an icon corresponding to an application, the user operation may be the tap operation. Correspondingly, in a subsequent step, the application may display a splash advertisement. Alternatively, when the terminal device detects that the user triggers a sliding operation on an interface corresponding to an application, the user operation may be the sliding operation. Correspondingly, in a subsequent step, the application may display a banner advertisement.

In a process in which the terminal device runs the application, the terminal device may detect a user operation triggered by the user on an interface corresponding to the application. If the terminal device detects the user operation triggered by the user, the application may obtain the advertisement unit identifier based on detecting of an event that triggers the user operation, so that in a subsequent step, the terminal device may display a corresponding advertisement to the user based on the advertisement unit identifier.

It should be noted that, the advertisement unit identifier may be preset in the application, or may be obtained by the terminal device by requesting from an advertisement server. The following is described by using an example in which the advertisement unit identifier is obtained by the terminal device by applying to the advertisement server when a developer develops the application.

Step 802: The application of the terminal device invokes an SDK to obtain context information (a type of the application, the user operation, hardware information, a network environment, and user feedback information) of the application.

The context information may include: the type of the application, the user operation triggered by the user on the interface corresponding to the application, the hardware information of the terminal device, the network environment in which the terminal device is currently located, and the user feedback information. The user feedback information is information that is recorded by the terminal device and that is fed back by the user for advertisements displayed based on different context information.

Specifically, the type of the application may be a video type, a game type, an information type, a shopping type, a novel type, a social type, a wealth-management type, a travel type, or the like. The user operation triggered by the user on the interface corresponding to the application may be initialization, sliding, tap, or the like. The hardware information of the terminal device may be a model of the terminal device, and a mapping advertisement service may determine, based on the model of the terminal device, that the terminal belongs to a high-end model or a low-end model. The network environment in which the terminal device is currently located may be a wireless fidelity (wireless fidelity, Wi-Fi) network, a 2G, a 3G, a 4G, a 5G, or the like. The user feedback information may include: The user considers that an advertisement displayed at a location affects the user, or the like. The foregoing context information is not limited in this embodiment of this application.

For example, the terminal device is currently in a video-watching scenario. If the terminal device accesses a Wi-Fi network and detects a playing operation triggered by the user on a video, context information of the video application may include: The type of the application is the video application, the user operation is the playing operation, the hardware information of the terminal device is the model of the terminal device, and the network environment in which the terminal device is currently located is the Wi-Fi network. The network environment in which the terminal device is currently located and the hardware information of the terminal device may be obtained after user authorization is obtained.

Certainly, the context information may further include information such as an application theme, and the application theme indicates a theme corresponding to content currently browsed by the user. For example, when the terminal device currently runs a shopping application, and a page currently displayed by the terminal device is a page corresponding to cosmetics, the context information obtained by the terminal device may include the application theme, and the application theme may indicate that the user is currently browsing content in terms of the cosmetics. Further, the application theme may further indicate information such as a brand and a type that correspond to each cosmetic on the currently displayed page.

In a possible implementation, after obtaining the advertisement unit identifier, the application of the terminal device may invoke the SDK in the application based on a preset interface, and obtain the context information of the application by using the SDK, so that, in a subsequent step, the application may determine the matched advertisement parameter based on the context information.

For example, the application of the terminal device may obtain the context information based on the following code, to send a first advertisement request to the advertisement server, so as to request an advertisement corresponding to the context information. AdUnitId is the advertisement unit identifier, AdContext is the context information of the application, and A, B, C, and D respectively represent the hardware information of the terminal device, the type of the application, the operation triggered by the user on the interface corresponding to the application, and the network environment in which the terminal device is currently located.

terminal device is located. If the terminal device detects an authorization operation triggered by the user, the application may read and store the hardware information of the terminal device. In addition, when application logic of the application detects that an advertisement needs to be displayed, the application may obtain, in real time, the network environment in which the terminal device is currently located.

In addition, in the process of obtaining the context information, the application may fail to obtain the complete context information due to insufficient authorization of the terminal device. In other words, the application may obtain only a part of information in the context information. The context information obtained by the application is not limited in this embodiment of this application Correspondingly, the more context information the application obtains, the more accurate the advertisement parameter determined by the mapping advertisement service in a subsequent step based on the context information is.

For example, if the application does not obtain the authorization of the terminal device, the context information obtained by the application may include only the type of the application, the user operation, and the user feedback information. Alternatively, if the application logic of the application detects that when the advertisement needs to be displayed currently, the terminal device does not detect user operation, the context information obtained by the application does not include the user operation.

Step 803: The application of the terminal device invokes the mapping advertisement service in the SDK, and generates a first advertisement request (the advertisement unit identifier and the advertisement parameter) based on the advertisement unit identifier and the context information.

The mapping advertisement service determines a mapping relationship of the advertisement parameter based on the context information, and the mapping advertisement

```
    AdView adView=new AdView(this, AdType.DYNAMIC)          //Use a dynamic
advertisement unit
    adView.setAdUnitId(sd-d93728f8238hf8w-fu8sh3)           //Set an advertisement unit
identifier
    ...
    AdContext adContext=new AdContext( );   //Context information
    adContext.set(A, B, C, D);   //Set context information
    adView.RequestAd( );   //Request an advertisement.
```

It should be noted that, in a process of obtaining the context information, the application may use different obtaining manners for different context information. The application may obtain the type of the application in advance. Alternatively, after obtaining authorization of the terminal device, the application may obtain the hardware information of the terminal device in advance. Alternatively, the application may detect and obtain, in real time by using the terminal device, the user operation triggered by the user on the interface corresponding to the application. Alternatively, after obtaining authorization of the terminal device, the application may obtain, in real time, the network environment in which the terminal device is currently located. In addition, the terminal device may also generate the user feedback information based on a triggered feedback operation, and the terminal device may also receive and store user feedback information sent by the advertisement server.

Specifically, after the terminal device installs the application, the application may request the terminal device to obtain permission, to obtain the hardware information of the terminal device and the network environment in which the service may be adjusted based on the user feedback information obtained by the advertisement server through counting. The advertisement parameter may include an advertisement format, an advertisement type, an advertisement location, and the like. The advertisement parameter is not limited in this embodiment of this application.

After obtaining the context information, the application of the terminal device may invoke the mapping advertisement service in the SDK, and perform matching by using the mapping advertisement service, based on the context information of the application, and in combination of weights corresponding to the different information in the context information, to obtain the advertisement parameter that matches a current scenario, to be specific, obtain information such as an advertisement format, an advertisement type, and an advertisement location that match the current scenario. Then, the application of the terminal device may generate, based on the advertisement unit identifier obtained in step 801 and the advertisement parameter obtained in step 803, the first advertisement request for requesting an advertisement from the advertisement server.

The type and the application theme of the application in the context information are for determining a field corresponding to the advertisement. The user operation is for determining an advertisement location for displaying the advertisement. The hardware information of the terminal device and the network environment in which the terminal device is currently located are for determining an advertisement format and an advertisement type. The user feedback information is for determining whether the field corresponding to the advertisement needs to be adjusted and whether the advertisement needs to be displayed.

Corresponding to that the context information includes a plurality of pieces of information, the mapping advertisement service may determine, in different manners for the plurality of pieces of information in the context information, an advertisement format and an advertisement type that match the context information, to generate the first advertisement request in combination of the advertisement unit identifier.

In an optional embodiment, the mapping advertisement service may determine, based on the type of the application, a scenario currently corresponding to the terminal device. Then, the mapping advertisement service may further determine, based on a label corresponding to content currently displayed by the application, that is, the application theme of the application, content currently browsed by the user. Then, the mapping advertising service may determine the field corresponding to the advertisement, to associate an advertisement presented to the user with the content currently browsed by the user.

In another optional embodiment, the mapping advertisement service may determine, based on an operation triggered by the user on a current interface of the application, a tap action, a sliding action, a dragging action, or another action triggered by the user, to determine an advertisement location for displaying the advertisement on the current interface. The operation triggered by the user is obtained by monitoring an event performed by the application for triggering of the terminal device.

In still another optional embodiment, the mapping advertisement service may determine, based on the hardware information of the terminal device, that the terminal device is the high-end model or the low-end model, so that an unused advertisement format and advertisement type can be determined based on different models. For example, if the terminal device is the high-end model, the mapping advertisement service may determine that the advertisement type is a video, so that high-quality advertisement content can be displayed to the user. If the terminal device is the low-end model, the mapping advertisement service may determine that the advertisement type is a text or a picture, to avoid a case such as frame freezing when the terminal device displays the advertisement. The hardware information is obtained after the application applies to the terminal device for permission.

In still another optional embodiment, the mapping advertisement service may determine, based on the network environment in which the terminal device is currently located, a network speed of the network environment in which the terminal device is located, so that an advertisement format and an advertisement type that match different network speeds can be determined. For example, if the network environment in which the terminal device is located is the Wi-Fi network or the 4G network, the mapping advertisement service may determine that the advertisement type is a video. If the network environment in which the terminal device is located is the 2G or the 3G, the mapping advertisement service may determine that the advertisement type is a text or a picture, to prevent the terminal device from spending much time downloading the advertisement. The network environment in which the terminal device is currently located is also obtained after the application applies to the terminal device for permission.

After determining an advertisement type an advertisement format, and an advertisement location that correspond to the context information, the mapping advertisement service may determine, based on weights respectively corresponding to the plurality of pieces of information in the context information, the advertisement type, the advertisement format, and an advertisement location that match the context information. For example, if the advertisement type determined based on the hardware information of the terminal device is the picture or the text, and the advertisement type determined based on the network environment of the terminal device is the video, but a weight of the hardware information of the terminal device is higher than a weight of the network environment of the terminal device, it may be determined that the advertisement type that matches the context information is the picture or the text.

However, if a result obtained by the mapping advertisement service through matching based on the context information is no longer displaying the advertisement, the terminal device may no longer generate the first advertisement request, and no longer send the first advertisement request to the server. The terminal device and the advertisement server no longer perform a subsequent step, and the terminal device no longer displays the advertisement in the current scenario.

It should be noted that, during actual application, when uploading an advertisement material, an advertiser may determine, while determining the advertisement format, an advertisement location corresponding to the advertisement format. Correspondingly, when determining the corresponding advertisement parameter based on the context information, the mapping advertisement service does not need to output the advertisement location, but only needs to determine the advertisement format corresponding to the context information, so that the advertisement location for displaying the advertisement may be determined.

However, for an advertisement material whose advertisement location is not determined, the mapping advertisement service may further determine the advertisement location while determining the advertisement format and the advertisement type based on the context information, so that the terminal device can display the advertisement in an area corresponding to the advertisement location.

In addition, the mapping advertisement service located in the SDK may not only obtain the advertisement parameter corresponding to the context information through real-time matching, but also prestore advertisement parameters corresponding to a plurality of pieces of context information. When determining an advertisement parameter corresponding to the current scenario, the application may quickly determine, based on the advertisement parameters that correspond to different context information and that are prestored by the mapping advertisement service, the advertisement parameter corresponding to the current scenario. The mapping advertisement service does not need to perform real-time matching based on the context information to obtain the advertisement parameter corresponding to the current scenario. Therefore, efficiency of generating the first advertisement request can be improved.

In addition, it should be noted that, in a process of generating the first advertisement request, the terminal device may further add a terminal identifier or a user identifier to the first advertisement request, so that the advertisement server can feed back advertisement information to the terminal device based on the terminal identifier or the user identifier.

Step 804: The terminal device sends the first advertisement request to the advertisement server.

After the application generates the first advertisement request, the terminal device may send the first advertisement request to the server, so that the server can search and feed back, based on the first advertisement request, advertisement information that matches the current scenario of the terminal device to the terminal device, to improve a click-through rate and a conversion rate of the advertisement.

Step 805: The advertisement server receives the first advertisement request, and obtains advertisement information (an advertisement identifier and a download path) based on the first advertisement request.

The advertisement information includes the advertisement identifier and the download path, and the advertisement identifier uniquely identifies the advertisement in the advertisement server. The advertisement identifier may be allocated, when an advertisement platform receives an advertisement material uploaded by a second terminal device, by the advertisement platform to the advertisement material. Alternatively, the advertisement identifier may be allocated, when the advertisement server receives an advertisement material sent by an advertisement platform, by the advertisement server to the advertisement material. This is not limited in this embodiment of this application.

After the advertisement server receives the first advertisement request sent by the terminal device, the advertisement server may analyze the first advertisement request to obtain an advertisement unit identifier and an advertisement parameter that are in the third advertisement request, and then search a plurality of advertisements for a matching advertisement based on each piece of information obtained through analysis.

The advertisement server may include a large quantity of advertisements released by the advertiser and transmitted by the advertisement platform. After the advertisement server receives the first advertisement request, the advertisement server may initiate bidding to each advertiser to obtain an advertisement that matches an advertisement parameter in the first advertisement request and wins the bidding, so that the advertisement is used as an advertisement that matches the first advertisement request.

Then, the advertisement server may obtain an advertisement identifier and a download path of the advertisement, and advertisement information may be formed based on the advertisement identifier and the download path of the advertisement, so that in a subsequent step, the advertisement server may send the advertisement information to the terminal device, which enables the terminal device to display the advertisement based on the advertisement information.

It should be noted that, the advertisement server may receive a large quantity of advertisement materials transmitted by the advertisement platform, and an advertisement parameter, an advertisement identifier, and the like that correspond to each advertisement material. The advertiser may upload, according to the interface shown in FIG. 3, the advertisement material to the advertising platform by using the second terminal device, and upload information such as the advertisement parameter corresponding to the advertisement material to the advertising platform. Alternatively, the advertiser may upload, according to the interface shown in FIG. 4, the advertisement material to the advertisement platform by using the second terminal device, and the advertisement platform may analyze the advertisement material to determine information such as the advertisement parameter corresponding to the advertisement material.

Step 806: The advertisement server sends the advertisement information to the terminal device.

After determining an advertisement that matches the current scenario of the terminal device, the advertisement server may send, based on a terminal identifier or a user identifier carried in the first advertisement request, advertisement information corresponding to the advertisement to the corresponding terminal device, so that the terminal device can obtain and display the advertisement based on the advertisement information.

Step 807: The terminal device receives the advertisement information, and displays an advertisement corresponding to the advertisement information.

After receiving the advertisement information sent by the advertisement server, the terminal device may obtain the advertisement material of the advertisement based on the advertisement identifier and the download path in the advertisement information. Then, the application may display the advertisement material of the advertisement based on an advertisement format corresponding to the advertisement, to display the advertisement that matches the current scenario to the user.

It should be noted that, during actual application, in a process of displaying the advertisement, the terminal device may further provide a feedback option in the advertisement for the user to select. If the terminal device detects a feedback operation triggered by the user on the feedback option, the terminal device may generate and record the user feedback information based on the feedback operation. For example, the feedback options provided by the terminal device may include a plurality of feedback options, such as not interested in this advertisement, advertisement blocked content, inappropriate advertisement, seen this advertisement a plurality of times and another.

In addition, the terminal device may further send the recorded user feedback information to the advertisement server. The advertisement server may receive user feedback information sent by a plurality of terminal devices, and forward user feedback information sent by another terminal device to the plurality of terminal devices. Correspondingly, the terminal device may receive the user feedback information recorded by another terminal device and sent by the advertisement server. Based on the recorded user feedback information and the received user feedback information, the terminal device may update and optimize the mapping advertisement service, and adjust a correspondence between the context information and the advertisement format and the advertisement type.

As mentioned above, according to the advertisement display system and method provided in this application, an application of the terminal device may obtain a preset advertisement unit identifier based on an operation triggered by the user, invoke an SDK of the application to obtain context information of the application, and then invoke a mapping advertisement service in the SDK to generate, based on an advertisement unit identifier and context information, a first advertisement request including the advertisement unit identifier and an advertisement parameter. Then, the terminal device may send the first advertisement request to the advertisement server. The advertisement server may receive the first advertisement request, search, based on the first advertisement request, an advertisement corresponding to the first advertisement request, and obtain advertisement information of the advertisement. Then the advertisement server may feed back the advertisement information corresponding to the advertisement to the terminal device. The terminal device may receive the advertisement information, and display the corresponding advertisement based on the advertisement information. By using an advertisement unit identifier of a dynamic advertisement unit, the terminal device may determine, based on the context information of the application, in other words, based on the current scenario of the terminal device, an advertisement parameter that matches the current scenario, to obtain an advertisement that matches the current scenario, and display the obtained advertisement based on the advertisement parameter, so that a matching degree and a fitting degree between the advertisement and the current scenario can be improved, and a click-through rate and a conversion rate of the advertisement can be further improved.

In a process of developing the application, a developer does not need to consider different locations that adapt the application and advertisement parameters that adapt different terminal devices, and only sets a dynamic advertisement unit in the application, and adds a corresponding advertisement unit identifier. In this way, the terminal device may determine, by using the advertisement unit identifier and in combination of the context information of the application, the advertisement parameter that matches the current scenario, so that complexity of developing the application can be simplified, costs of developing the application can be reduced, and efficiency of developing the application can be improved.

In addition, the advertisement server may also use the dynamic advertisement unit. When the advertisement server adds a new advertisement format, an advertisement corresponding to the new advertisement format can be fed back to the terminal device without waiting for the advertisement platform to perform related upgrade and optimization on the advertisement platform for the new advertisement format. Further, by using the dynamic advertisement unit, the advertisement server can increase a use rate of advertisements corresponding to different advertisement formats, to increase exposure, click-through, and a conversion rate of the advertisements, and further increasing revenue of an advertiser and an advertising alliance.

In addition, the terminal device may determine different advertisement parameters based on the context information of the application by using the advertisement unit identifier corresponding to the dynamic advertisement unit, and the advertisement server may feed back different advertisements to the terminal device based on the different advertisement parameters, to improve a placement probability of a high-quality advertisement, improve the user's acceptance of the displayed advertisement, and further improve publicity of the advertisement.

Further, by providing a feedback option to the user, the terminal device may obtain user feedback information of the user for each advertisement based on a feedback operation triggered by the user on the feedback option, and the terminal device and the server may continuously optimize and adjust the mapping advertisement service by collecting and analyzing a large quantity of user feedback information. In this way, an advertisement format and an advertisement type that are determined by the mapping advertisement service through matching are more easily accepted by the user, to improve effectiveness of advertisement placement.

Figure 9:
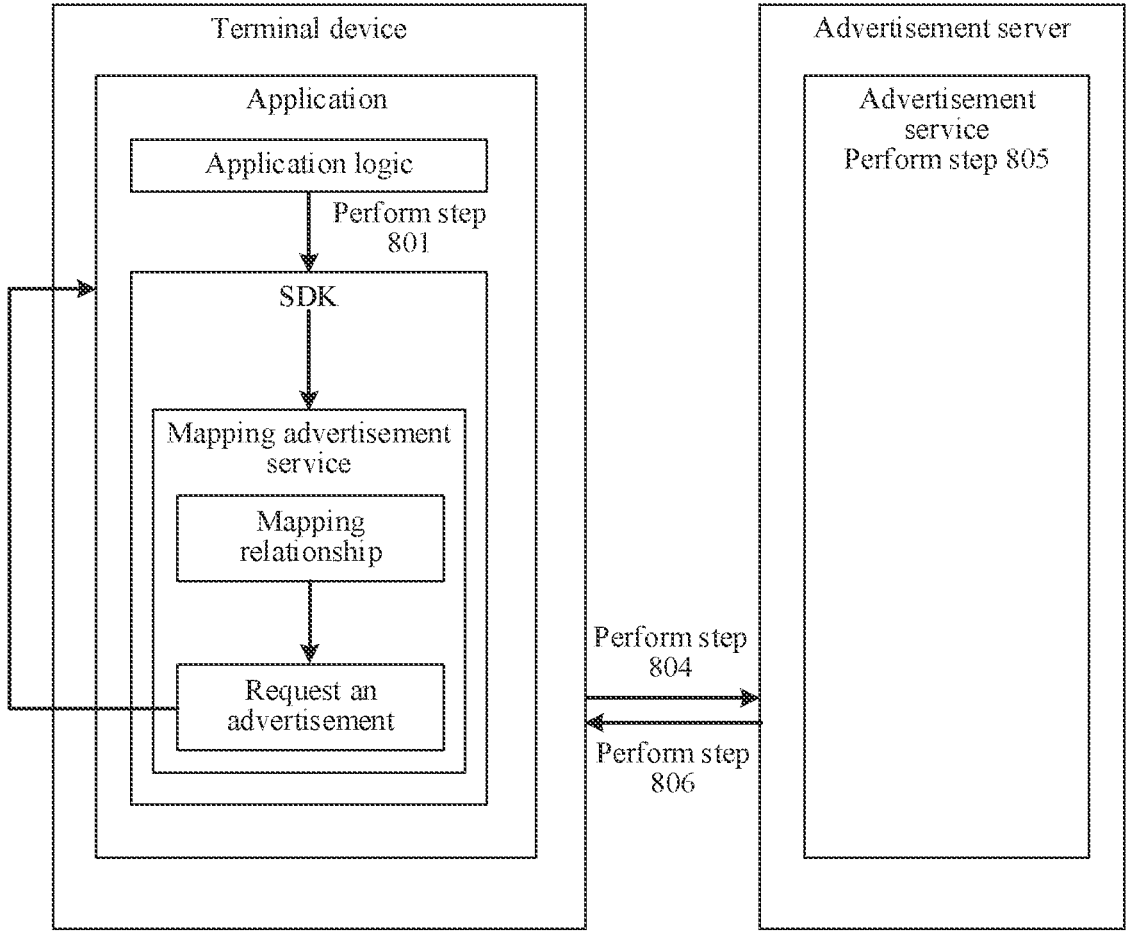
FIG. 9 is a diagram of a system architecture between a terminal device and an advertisement server according to an embodiment of this application.

It should be noted that, in the foregoing embodiment, an example in which the mapping advertisement service is located in the SDK of the application is used for description. Refer to FIG. 9. FIG. 9 shows a diagram of a system architecture between a terminal device and an advertisement server. In a process in which the terminal device runs art application, if application logic of the application detects that an advertisement can be displayed currently, the application may obtain unit identifiers. Then, an SDK is invoked to obtain context information currently corresponding to the application. Then, the application may invoke a mapping advertisement service in the SDK, determine, by using the mapping advertisement service based on a plurality of pieces of information in the context information and in combination of a mapping relationship of the mapping advertisement service, an advertisement parameter corresponding to the context information, and generate a first advertisement request in combination of the advertisement unit identifier. Finally, the terminal device may send the first advertisement request to the advertisement server, to request, from the advertisement server, an advertisement that matches the first advertisement request. Correspondingly, the advertisement server may search and obtain, based on the advertisement unit identifier and the advertisement parameter in the first advertisement request, an advertisement that matches the context information of the application, form advertisement information based on an advertisement identifier and a download path of the advertisement, and then send the advertisement information to the terminal device. The terminal device may obtain an advertisement material based on the advertisement information, and display the advertisement material based on a corresponding advertisement format.

However, the mapping advertisement service may alternatively be located in a server. FIG. 10 is a schematic flowchart of another advertisement display method according to an embodiment of this application. By way of example, and not limitation, the method may be applied to the foregoing first terminal device and advertisement server. A terminal device represents the first terminal device below. Refer to FIG. 10. The method includes the following steps.

Step 1001: An application of a terminal device obtains a preset advertisement unit identifier based on a user operation triggered by a user.

Step 1002: The application of the terminal device invokes an SDK to obtain context information (a type of the application, the user operation, hardware information, a network environment, and user feedback information) of the application, and generates a second advertisement request in combination of the advertisement unit identifier.

Step 1003: The terminal device sends the second advertisement request to an advertisement server.

Step 1004: The advertisement server receives the second advertisement request, obtains context information in the second advertisement request, and invokes a mapping advertisement service to obtain an advertisement parameter corresponding to the context information.

Step 1005: The advertisement server obtains advertisement information (an advertisement identifier and a download path) based on the advertisement parameter.

Step 1006: The advertisement server sends the advertisement information to the terminal device.

Step 1007: The terminal device receives the advertisement information, and displays an advertisement corresponding to the advertisement information.

The foregoing step 1001, step 1002, step 1006, and step 1007 are similar to step 801, step 802, step 806, and step 807, and details are not described herein again.

Because the mapping advertisement service is located in the advertisement server, the terminal device cannot invoke the mapping advertisement service to determine the advertisement parameter corresponding to the context information. Correspondingly, after generating the second advertisement request, the terminal device may send the second advertisement request to the advertisement server. After receiving the second advertisement request, the advertisement server may invoke the advertisement mapping service, and obtain, based on a process similar to step 803, the advertisement parameter corresponding to the context information, that is, obtain the advertisement parameter corresponding to the context information. Then, the advertisement server may obtain the advertisement information based on the advertisement parameter.

Figure 11:
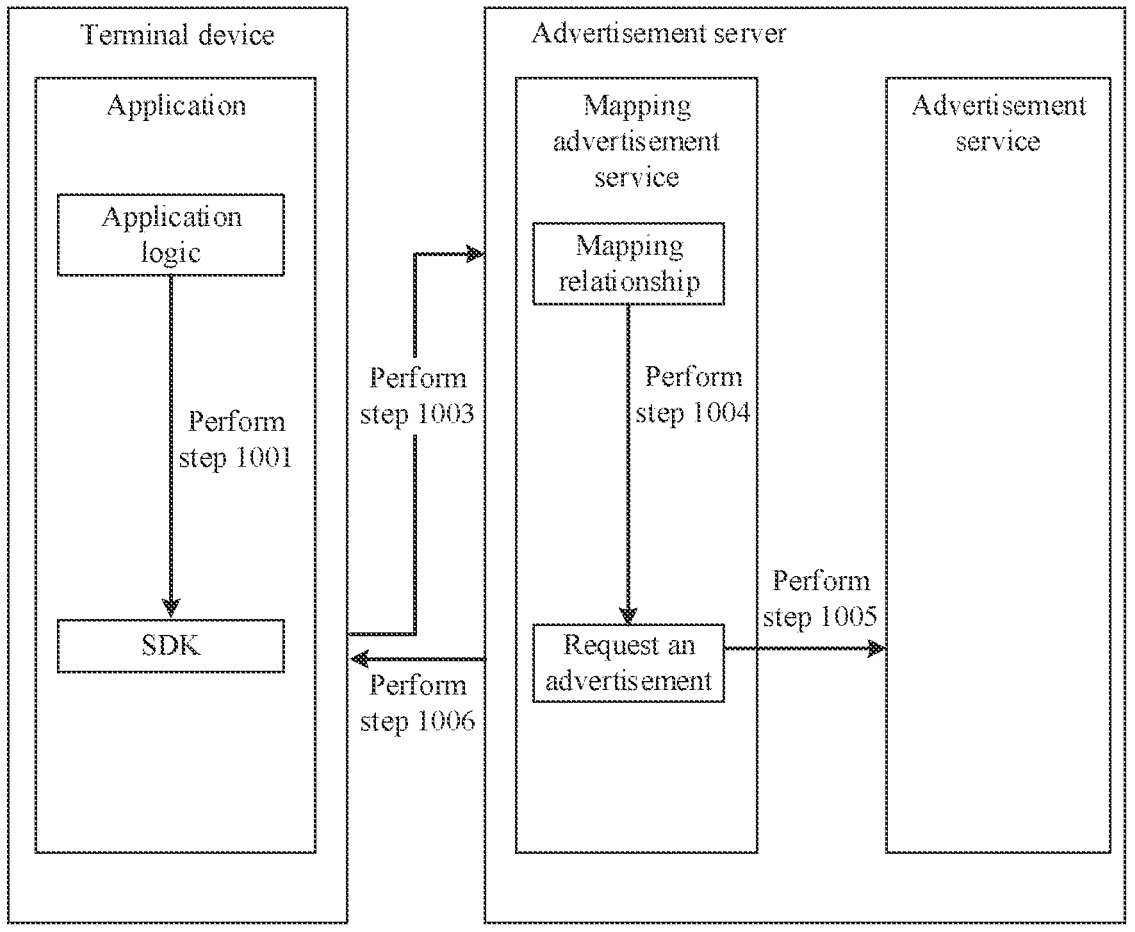
FIG. 11 is a diagram of another system architecture between a terminal device and an advertisement server according to an embodiment of this application.

Refer to FIG. 11. FIG. 11 shows a diagram of another system architecture between a terminal device and an advertisement server. The terminal device may obtain an advertisement unit identifier and context information based on a process similar to that in FIG. 9. Then, the terminal device may generate and send a second advertisement request to the advertisement server. The advertisement server may invoke a mapping advertisement service, and determine an advertisement parameter, by using a mapping relationship in the mapping advertisement service, based on a plurality of pieces of information in the context information of the second advertisement request. Then, the advertisement server may search and obtain, based on the advertisement parameter, an advertisement that matches the context information, form advertisement information based on an advertisement identifier and a download path of the advertisement, and then send the advertisement information to the terminal device. The terminal device may obtain an advertisement based on the advertisement information, and display the advertisement based on an advertisement format corresponding to the advertisement.

Figure 12:
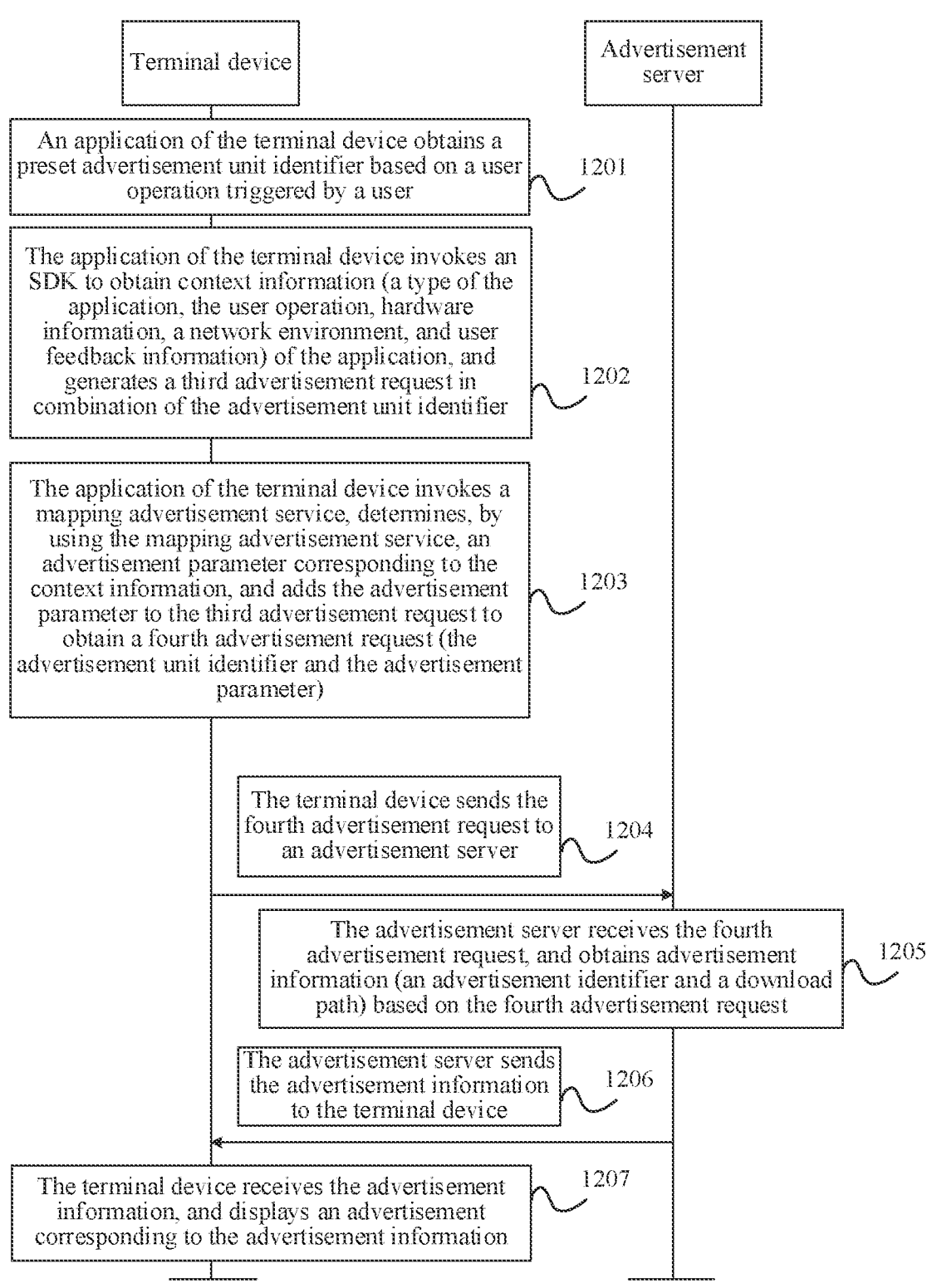
FIG. 12 is a schematic flowchart of still another advertisement display method according to an embodiment of this application.

In addition, the mapping advertisement service may alternatively be located in the terminal device and serve as a system service of the terminal device. FIG. 12 is a schematic flowchart of still another advertisement display method according to an embodiment of this application. By way of example, and not limitation, the method may be applied to the foregoing first terminal device and advertisement server. A terminal device represents the first terminal device below. Refer to FIG. 12. The method includes the following steps.

Step 1201: An application of a terminal device obtains a preset advertisement unit identifier based on a user operation triggered by a user.

Step 1202: The application of the terminal device invokes an SDK to obtain context information (a type of the application, the user operation, hardware information, a network environment, and user feedback information) of the application, and generates a third advertisement request in combination of the advertisement unit identifier.

Step 1203: The application of the terminal device invokes a mapping advertisement service, determines, by using the mapping advertisement service, an advertisement parameter corresponding to the context information, and adds the advertisement parameter to the third advertisement request to obtain a fourth advertisement request (the advertisement unit identifier and the advertisement parameter).

Step 1204: The terminal device sends the fourth advertisement request to an advertisement server.

Step 1205: The advertisement server receives the fourth advertisement request, and obtains advertisement information (an advertisement identifier and a download path) based on the fourth advertisement request.

Step 1206: The advertisement server sends the advertisement information to the terminal device.

Step 1207: The terminal device receives the advertisement information, and displays an advertisement corresponding to the advertisement information.

Processes of the foregoing step 1201, step 1202, and step 1204 to step 1207 are similar to processes of step 801, step 802, and step 804 to step 807 in the embodiment corresponding to FIG. 8, and details are not described herein again.

In a process in which the terminal device performs step 1203, the application may invoke an interface corresponding to the mapping advertisement service, and determine, by using the mapping advertisement service and in combination of the context information in the third advertisement request, the advertisement parameter corresponding to the context information. Then, the application may add an advertisement format, an advertisement type, and an advertisement location that are in the advertisement parameter to the third advertisement request, to obtain the fourth advertisement request.

Figure 13:
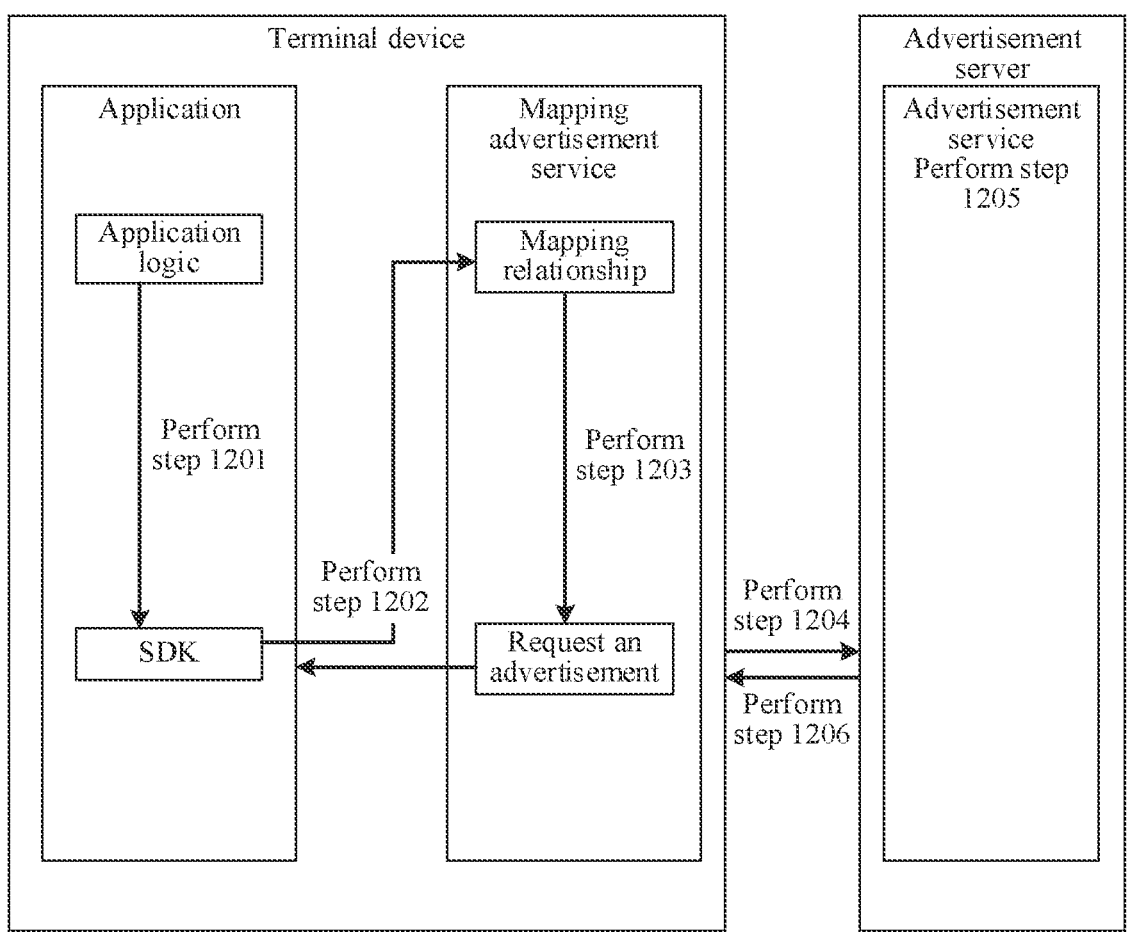
FIG. 13 is a diagram of still another system architecture between a terminal device and an advertisement server according to an embodiment of this application.

Refer to FIG. 13. FIG. 13 shows still another diagram of a system architecture between a terminal device and an advertisement server. The terminal device may generate a third advertisement request based on a process similar to that in FIG. 9. Then, the terminal device may invoke a mapping advertisement service serving as a system service, and determine an advertisement parameter by using the mapping advertisement service, to add the advertisement parameter to the third advertisement request to obtain the fourth advertisement request. Then, an interaction procedure between the terminal device and the advertisement server is similar to the interaction procedure shown in FIG. 9, and details are not described herein again.

The following uses an example in which the mapping advertisement service is located in an SDK of an application to describe a plurality of scenarios to which this embodiment of this application is applicable.

Figure 14:
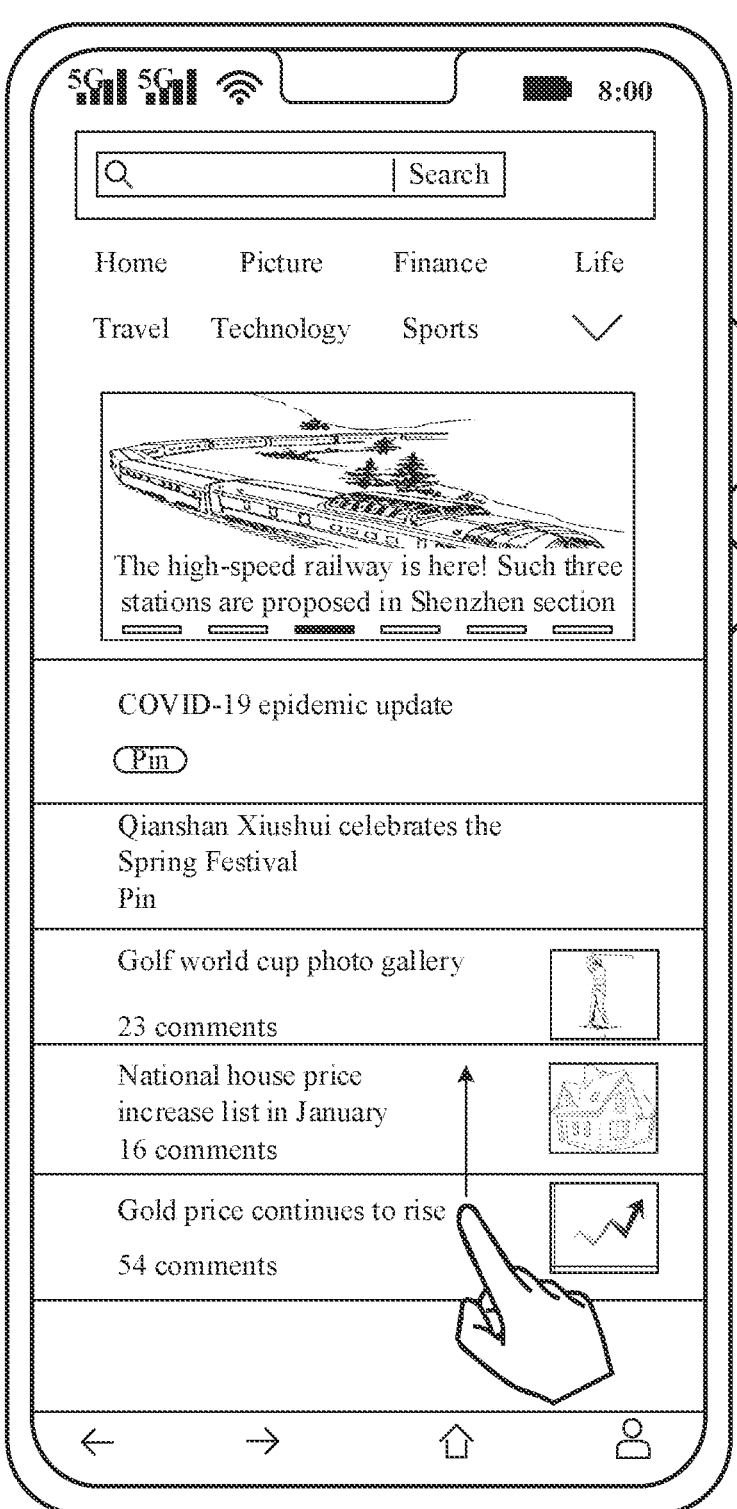
FIG. 14 is a schematic diagram of an interface on which a terminal device runs an information application according to an embodiment of this application.

Scenario 1: Refer to FIG. 14. FIG. 14 shows an interface on which a terminal device runs an information application. As shown in FIG. 14, if a terminal device detects a user operation of sliding up triggered by a user, the user operation may trigger obtaining of an advertisement unit identifier, and invoke an SDK to perform an operation corresponding to step 802. When the SDK performs step 802 to obtain context information, the obtained context information may include: A type of an application is an information type, the user operation is sliding up, pre-obtained hardware information of the terminal device is a model A (where the model A is a low-end model), and a network environment in which the terminal device is currently located is a Wi-Fi network.

Figure 15:
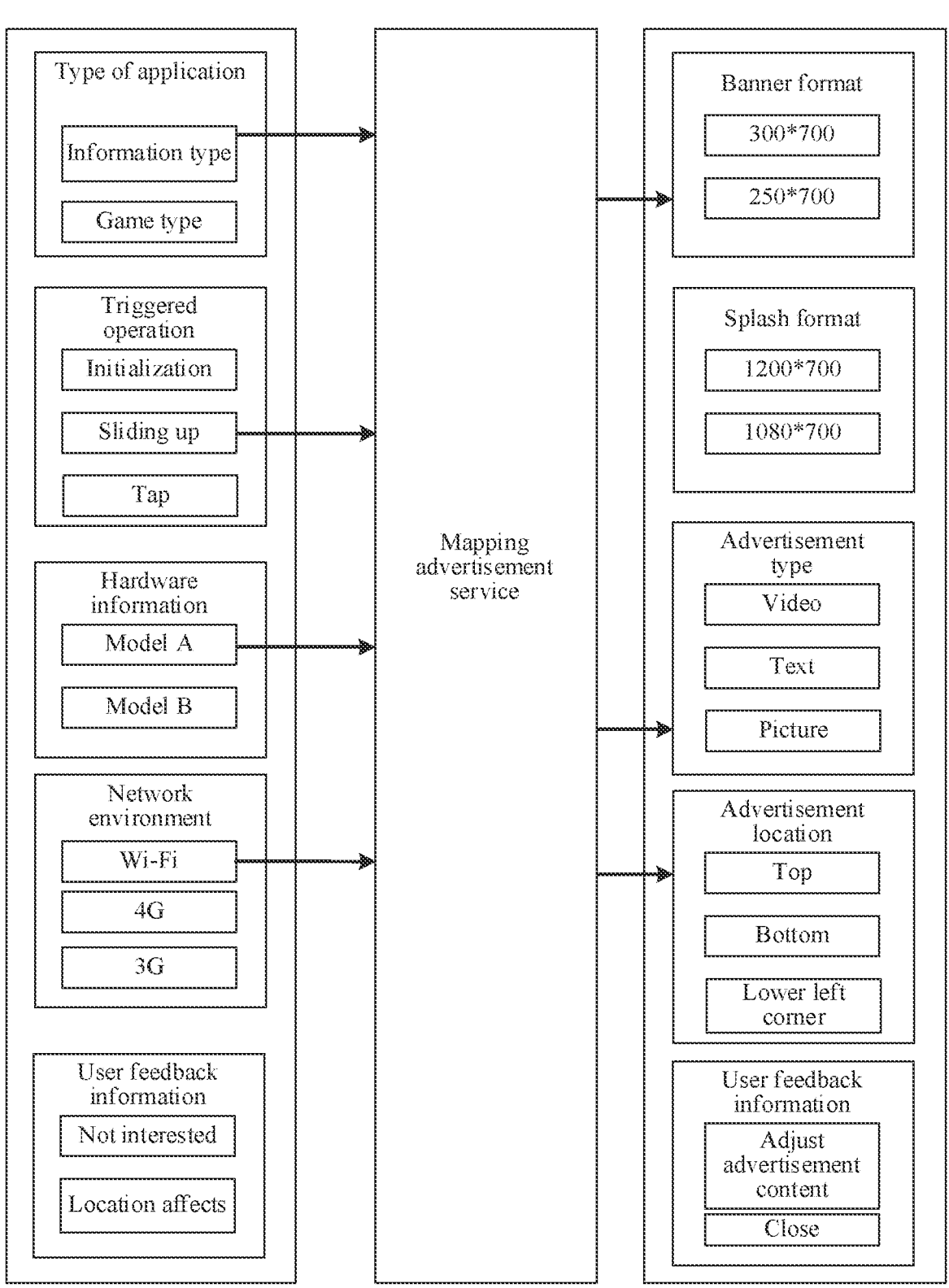
FIG. 15 is a schematic diagram of a mapping relationship according to an embodiment of this application.

Then, the terminal device may invoke a mapping advertisement service, determine, based on a mapping relationship (where the napping relationship does not show a field to which an advertisement that matches a current scenario belongs) shown in FIG. 15, and based on the context information an advertisement type, an advertisement format, and an advertisement location that correspond to the current scenario, and generate a first advertisement request in combination of the advertisement unit identifier. For example, refer to FIG. 15. A left part in FIG. 15 is context information of an application, a right part in FIG. 15 is an advertisement format, an advertisement type, an advertisement location, and whether an advertisement needs to be displayed, and a middle part in FIG. 15 is a mapping advertisement service. The mapping advertisement service may determine, based on hardware information of a terminal device and a network environment, that the advertisement type is a picture and the advertisement format is a banner (with a resolution of 250*700), and then determine, based on a user operation of sliding up, that the advertisement is displayed at a top of a current page, to determine that the advertising format in the banner format is used at the top of the current page.

Figure 16:
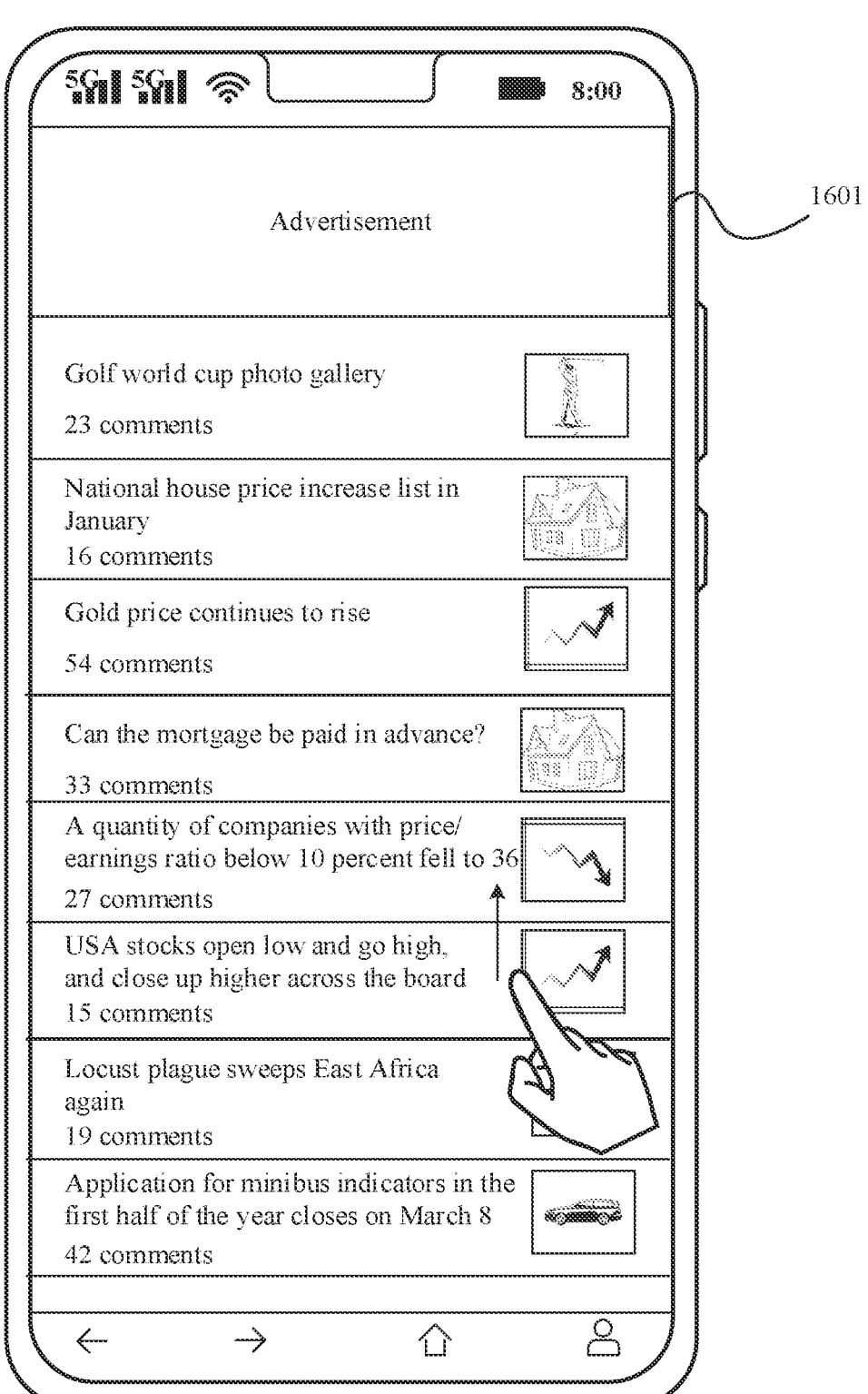
FIG. 16 is a schematic diagram of another interface on which a terminal device runs an information application according to an embodiment of this application.

Refer to FIG. 16. After a terminal device sends a first advertisement request to an advertisement server, and receives advertisement information fed back by the advertisement server, the terminal device may obtain an advertisement material based on the advertisement information, and display an advertisement 1601 in combination of a corresponding advertisement format and advertisement location in the advertisement information, and based on the banner format shown in FIG. 16.

Certainly, the foregoing process of determining, the advertisement format, the advertisement type, and the advertisement location, by using the mapping advertisement service, and based on the context information, and generating the third advertisement request may not only be applied to a scenario in which the terminal device runs the information application, but also be applied to a scenario in which the terminal device runs a video application, a game application, or a novel application separately. Certainly, the foregoing process may be alternatively applied to another scenario in which the advertisement can be displayed. This is not limited in this embodiment of this application.

Figure 17:
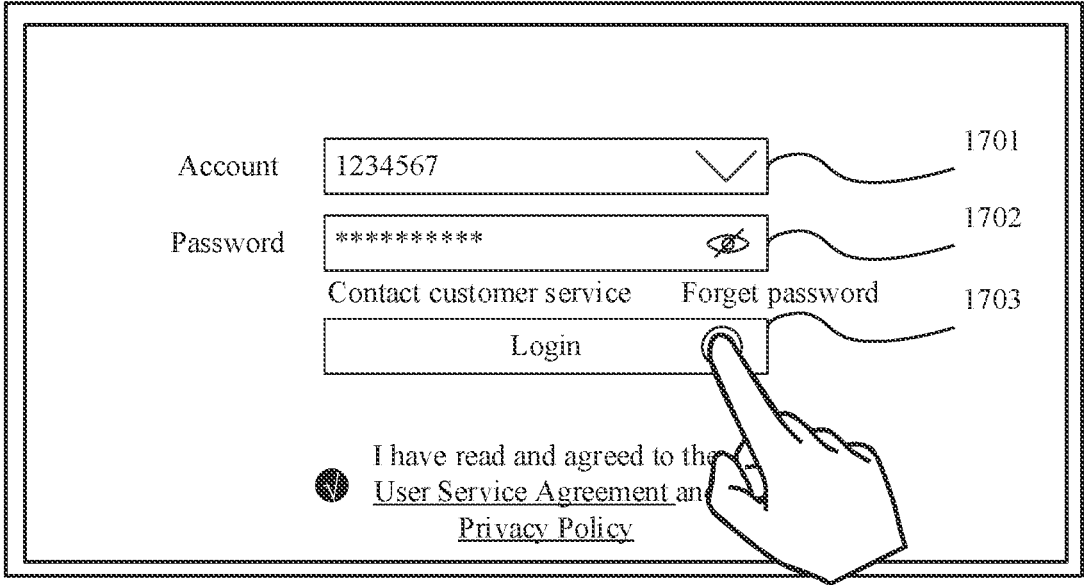
FIG. 17 is a schematic diagram of a login interface on which a terminal device runs a game application according to an embodiment of this application.

Scenario 2: Refer to FIG. 17. FIG. 17 shows a login interface on which a terminal device runs a game application. The login interface includes an account input box 1701, a password input box 1702, and a login option 1703. The terminal device detects a user operation of tap triggered by a user on the login option 1703, and the game application may jump to the loading interface. In addition, the user operation may trigger obtaining of an advertisement unit identifier, and invoke an SDK to perform an operation corresponding to step 802. When the SDK performs step 802 to obtain context information, the obtained context information may include: A type of an application is a game, the user operation is a tap operation, hardware information of the terminal device is a model B (where the model B is a high-end model), and a network environment in which the terminal device is currently located is a Wi-Fi network.

Figure 18:
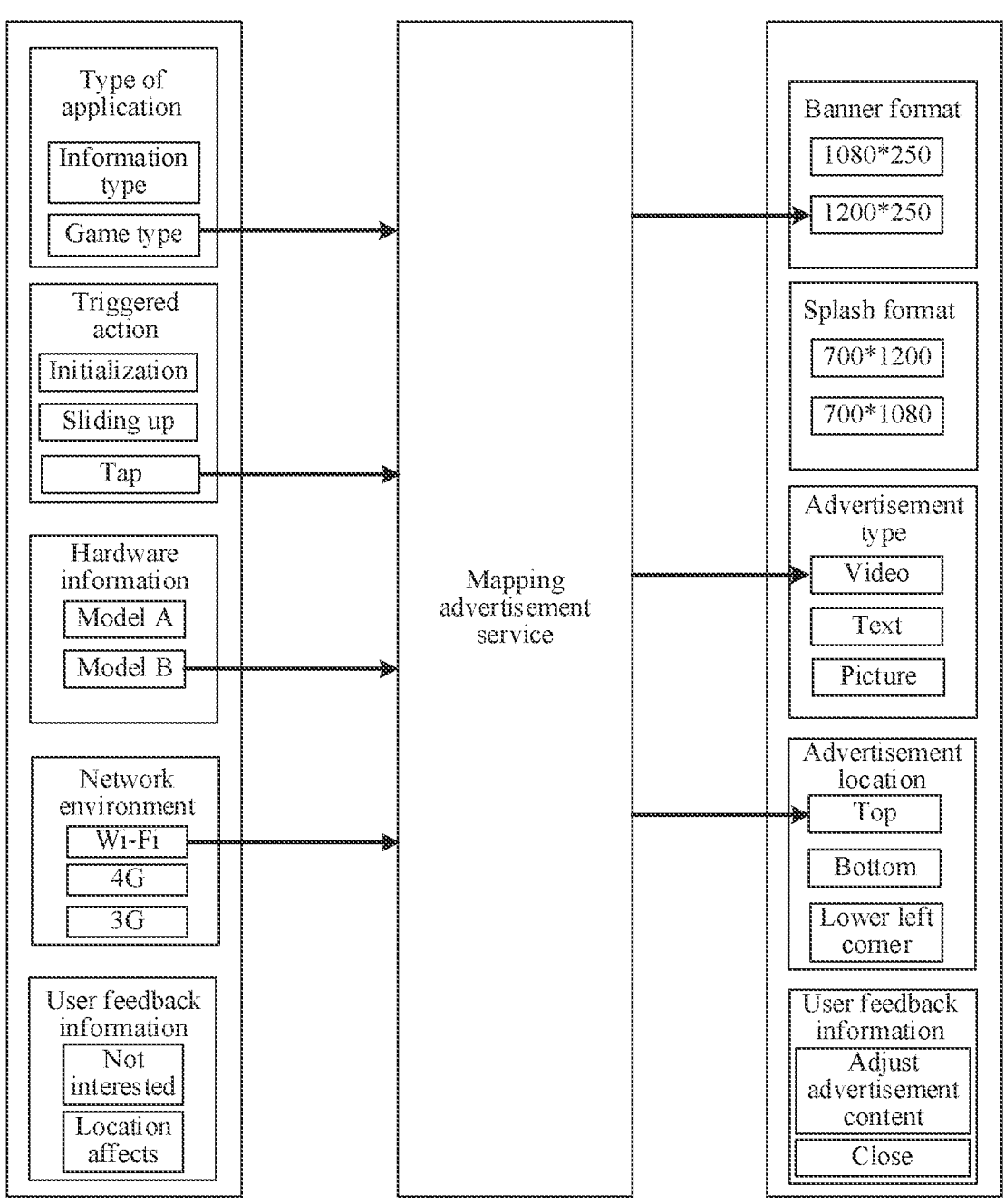
FIG. 18 is a schematic diagram of another mapping relationship according to an embodiment of this application.

Then, the terminal device may invoke a mapping advertisement service, determine, based on a mapping relationship (where the mapping relationship does not show a field to which an advertisement that matches a current scenario belongs) shown in FIG. 18, and based on the context information, an advertisement type, an advertisement format, and an advertisement location that correspond to the current scenario, and generate a first advertisement request in combination of the advertisement unit identifier. For example, refer to FIG. 18. The mapping advertisement service may determine, based on hardware information of a terminal device and a network environment, that an advertisement type is a video and an advertisement format is a banner (with a resolution of 1200*250), and then determine, based on a user operation, that an advertisement may be displayed at atop of a current page, to determine that the advertising format in the banner format is used at the top of the current page, and may further determine, based on a type of an application, that an advertisement (not shown in the figure) similar to a field to which the type of the application belongs is displayed to a user.

Figure 19:
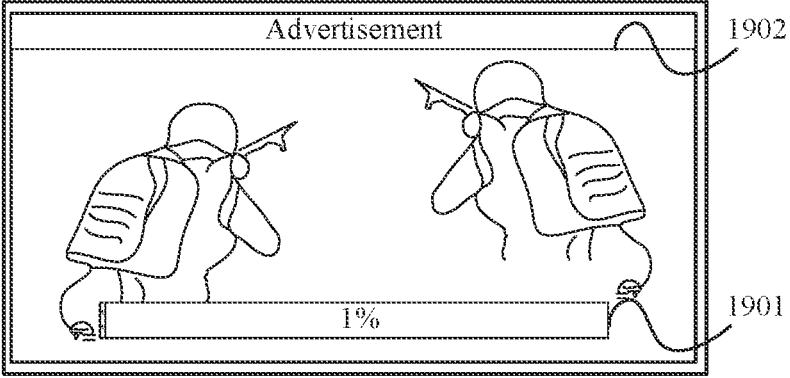
FIG. 19 is a schematic diagram of a loading interface on which a terminal device runs a game application according to an embodiment of this application.

Refer to FIG. 19. Correspondingly, similar to that the foregoing information application displays the banner advertisement, a game application may jump to the loading interface shown in FIG. 19. The loading interface includes a loading progress bar 1901 and an advertisement 1902. The advertisement 1902 is also displayed in a banner format. The advertisement is a video-type advertisement.

Figure 20:
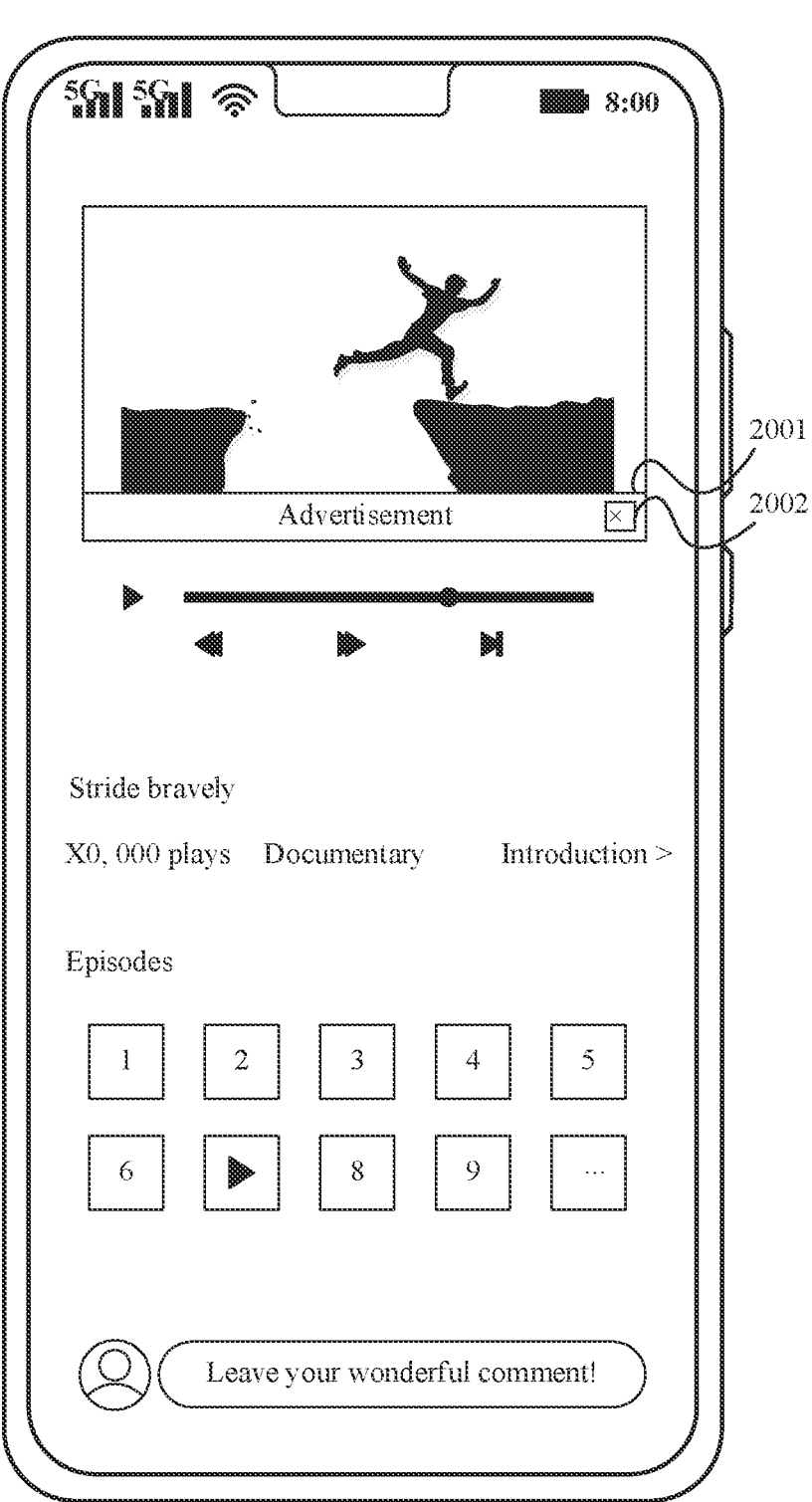
FIG. 20 is a schematic diagram of a playing interface on which a terminal device runs a video application according to an embodiment of this application.

Scenario 3: Refer to FIG. 20. A terminal device may run a video application. FIG. 20 shows a playing interface of the video application. The playing interface includes an advertisement 2001 and a close option 2002. The advertisement 2001 is located at a bottom of the playing interface, and the close option 2002 is located at an upper right corner of the advertisement 2001. The terminal device detects a tap operation triggered by a user on the close option 2002, and the advertisement 2001 on the playing interface changes to the playing interface that includes a plurality of feedback options and that is shown in FIG. 21.

Figure 21:
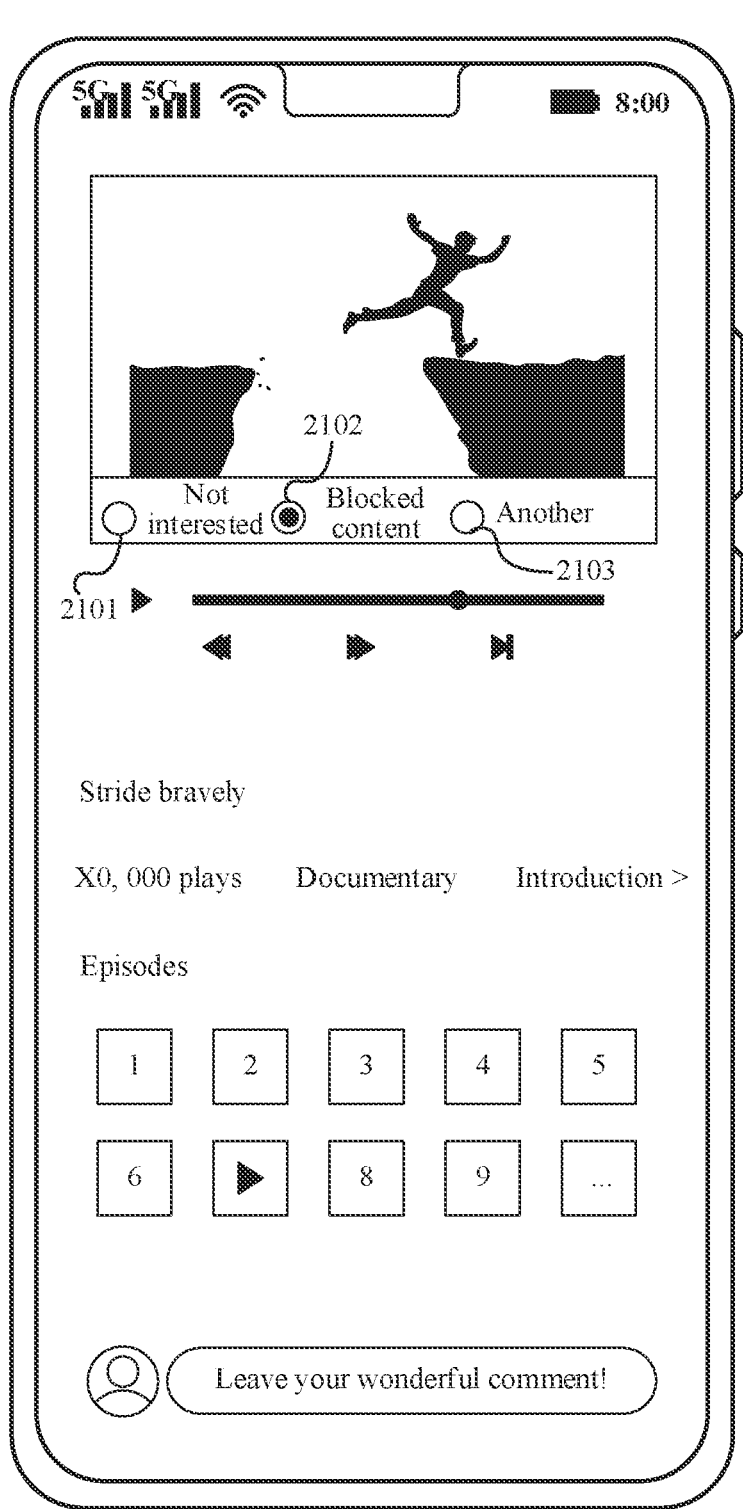
FIG. 21 is a schematic diagram of another playing interface on which a terminal device runs a video application according to an embodiment of this application.

Refer to FIG. 21. The feedback options in the playing interface include: not interested 2101, blocked content 2102, and another 2103. When a terminal device detects a second operation triggered by a user on the blocked content 2102, the terminal device may generate user feedback information for a current scenario based on the second operation.

Then, when the terminal device runs the video application again and plays video content, the video application may invoke, based on a playing operation triggered by the user, the SDK to perform an operation corresponding to step 802. When an SDK performs step 802 to obtain context information, the obtained context information may include: A type of an application is a video-type, a user operation is tap, pre-obtained hardware information of the terminal device is a model A (where the model A is a low-end model), a network environment in which the terminal device is currently located is a Wi-Fi network, and user feedback information is that an advertisement causes block.

Figure 22:
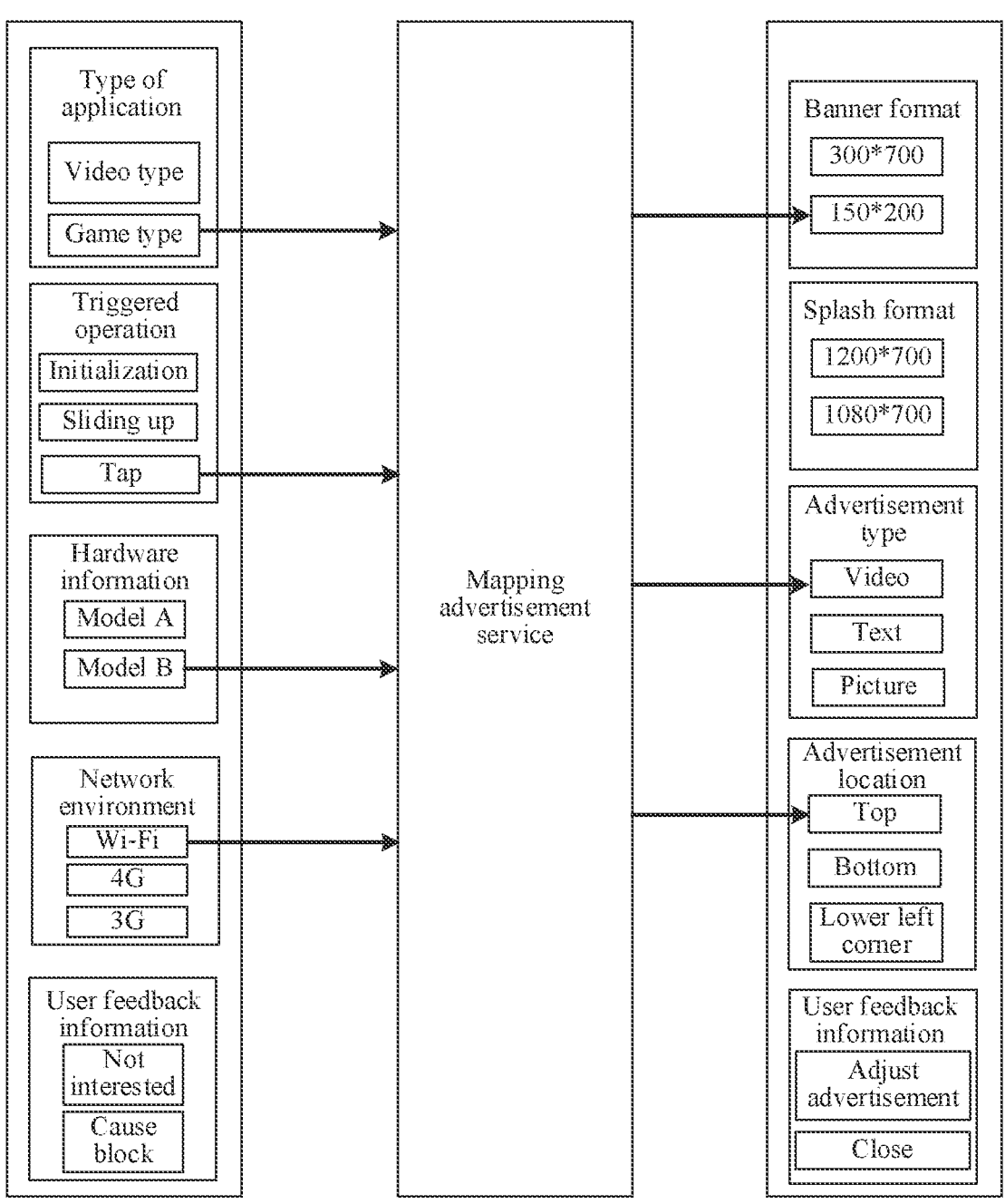
FIG. 22 is a schematic diagram of still another mapping relationship according to an embodiment of this application.
Figure 23:
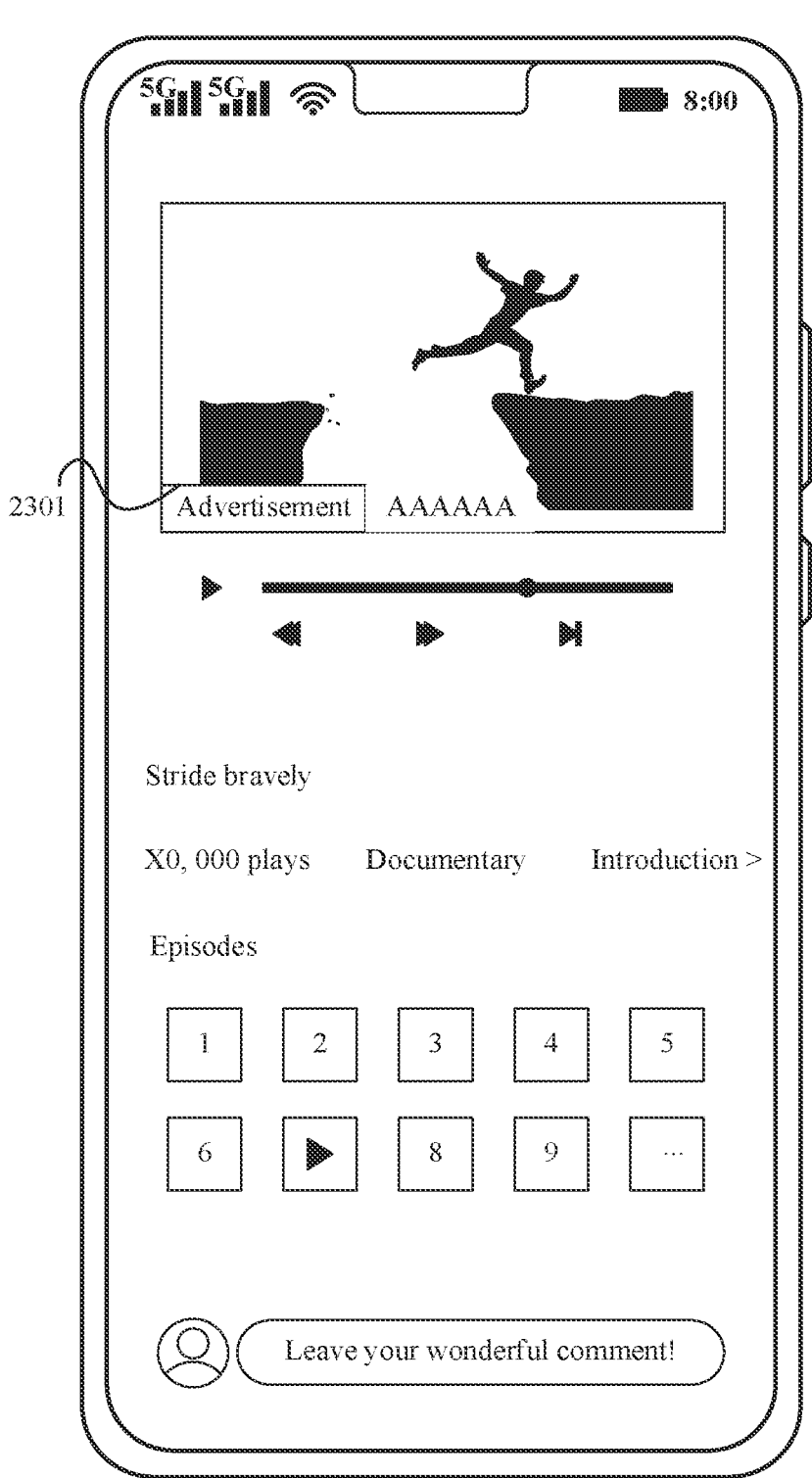
FIG. 23 is a schematic diagram of still another playing interface on which a terminal device runs a video application according to an embodiment of this application.

Correspondingly, the video application may adjust, based on the mapping relationship shown in FIG. 22, a size and location of an area occupied for displaying the advertisement, and replace a banner advertisement displayed in a bottom central location with a banner advertisement displayed in a lower left corner (with a resolution of 150*200). Correspondingly, the terminal device may display the playing interface shown in FIG. 23, and an advertisement 2301 in the playing interface is located at a lower left corner of the playing interface, so that a subtitle "AAAAAA" in the playing interface may be displayed.

It should be understood that, sequence numbers of the steps in the foregoing embodiments do not mean execution sequences. Execution sequences of the processes should be determined based on functions and internal logic of the processes, and should not be construed as any limitation on an implementation process of embodiments of this application.

It may be clearly understood by a person skilled in the art that, for the purpose of convenient and brief description, division of the foregoing functional units and modules is merely used as an example for description. During actual application, the foregoing functions nay be allocated to different functional units and modules for implementation based on a requirement, in other words, an internal structure of the apparatus is divided into different functional units or modules to implement all or some of the functions described above. The functional units and modules in the embodiments may be integrated into one processing unit, or each unit may exist alone physically, or two or more units may be integrated into one unit. The foregoing integrated unit may be implemented in a form of hardware, or may be implemented in a form of a software functional unit. In addition, specific names of the functional units and modules are merely used for ease of distinguishing from each other, but are not intended to limit the protection scope of this application. For a specific working process of the units and modules in the foregoing system, refer to a corresponding process in the foregoing method embodiment, and details are not described herein again.

In the foregoing embodiments, descriptions of each embodiment have different emphasis. For a part that is not described in detail or recorded in an embodiment, refer to related descriptions in another embodiment.

A person of ordinary skill in the art may be aware that units and algorithm steps in the examples described with reference to the embodiments disclosed in this specification may be implemented by electronic hardware or a combination of computer software and electronic hardware. Whether these functions are executed in a hardware or software manner depends on a specific application and a design constraint condition of technical solutions. A person skilled in the art may use different methods to implement the described functions for each specific application. However, it should not be considered that this implementation goes beyond the scope of this application.

In the embodiments provided in this application, it should be understood that the disclosed apparatuses and methods may be implemented in another manner. For example, the system embodiment described above is merely an example. For example, division of the modules or units is merely logical function division, and may be another division in actual implementation. For example, a plurality of units or components may be combined or integrated into another system, or some features may be ignored or not performed. In addition, the displayed or discussed mutual couplings or direct couplings or communication connections may be through some interfaces, and indirect couplings or communication connections of the apparatuses or units may be in electrical, mechanical, or another form.

The units described as separate components may or may not be physically separate, and components displayed as units may or may not be physical units, that is, may be located in one place, or may be distributed on a plurality of network units. Some or all of the units may be selected based on actual requirements to achieve the objectives of the solutions in the embodiments.

In addition, functional units in embodiments of this application may be integrated into one processing unit, or each unit may exist alone physically, or two or more units may be integrated into one unit. The foregoing integrated unit may be implemented in a form of hardware, or may be implemented in a form of a software functional unit.

If the integrated unit is implemented in the form of the software functional unit and sold or used as an independent product, the integrated unit may be stored in a computer-readable storage medium. Based on this understanding, all or some of the processes of the methods in the foregoing embodiments in this application may be implemented by a computer program instructing related hardware. The computer program may be stored in the computer-readable storage medium. When the computer program is executed by a processor, the steps of the foregoing method embodiments may be implemented. The computer program includes computer program code, and the computer program code may be in a source code form, an object code form, an executable file, some intermediate forms, or the like. The foregoing computer-readable medium may include at least: any entity or apparatus that can carry the computer program code to a terminal device, a recording medium, a computer memory, a read-only memory (ROM, Read-Only Memory), and a random access memory (RAM, Random Access Memory), an electrical carrier signal, a telecommunications signal, and a software distribution medium, such as a USB flash drive, a removable hard disk, a floppy disk, or an optical disc. In some jurisdictions, legislation and patent practice prohibit a computer-readable medium from being an electrical carrier signal and a telecommunications signal.

Finally, it should be rioted that, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An advertisement display system comprising:
a first terminal device configured to:
   detect a first operation of a user;
   obtain, in response to the first operation, context information corresponding to a current scenario of the first terminal device, wherein the context information comprises hardware information of the first terminal device, a network environment in which the first terminal device is located, and the first operation;
   determine, based on the first operation and the context information, an advertisement location corresponding to the context information;
   generate, based on the context information and the advertisement location, a first advertisement request comprising the advertisement location; and
   send the first advertisement request; and
an advertisement server coupled to the first terminal device and configured to:
   receive, from the first terminal device, the first advertisement request;
   obtain, based on the first advertisement request, first advertisement information that matches the context information; and
   send, to the first terminal device, the first advertisement information indicating first advertisement content, wherein the context information is associated with the first advertisement content,
wherein the first terminal device is further configured to:
   obtain the first advertisement information fed back by the advertisement server; and
   display, based on the first advertisement information, the first advertisement content in an area corresponding to the advertisement location.

2. The advertisement display system of claim 1, wherein the first advertisement request comprises an advertisement parameter corresponding to the context information, and wherein the first terminal device is further configured to:
   obtain the advertisement parameter; and
   further generate, based on the advertisement parameter, the first advertisement request.

3. The advertisement display system of claim 2, wherein the advertisement parameter comprises an advertisement format corresponding to the context information, an advertisement type corresponding to the context information, and the advertisement location, which corresponds to the context information, and wherein the first terminal device is further configured to:
   determine, based on the hardware information and the network environment, the advertisement format and the advertisement type; and
   adjust, based on a mapping relationship between the context information and the advertisement parameter, a size or location of an area occupied for displaying the first advertisement content.

4. The advertisement display system of claim 1, wherein the first advertisement request comprises the context information, and wherein the first terminal device is further configured to:

obtain an advertisement unit identifier before generating the first advertisement request; and further generate, based on the advertisement unit identifier, the first advertisement request, and wherein the advertisement server is further configured to:

determine, based on the first advertisement request, an advertisement parameter associated with the context information; and further obtain, based on the advertisement parameter, the first advertisement information.

5. The advertisement display system of claim 1, wherein the first terminal device is further configured to:

obtain an advertisement unit identifier before generating the first advertisement request; and generate, based on the advertisement unit identifier, the first advertisement request.

6. The advertisement display system of claim 1, further comprising a second terminal device coupled to the advertisement server and configured to upload the first advertisement content to the advertisement server, and wherein the advertisement server is further configured to:

receive the first advertisement content; and allocate an advertisement identifier to the first advertisement content.

7. The advertisement display system of claim 6, wherein the advertisement server is further configured to obtain an advertisement parameter corresponding to the first advertisement content and comprising an advertisement format, an advertisement type, and the advertisement location of the first advertisement content, or wherein the second terminal device is further configured to:

determine, based on a second operation from the user, the advertisement parameter; and send, to the advertisement server, the advertisement parameter.

8. An advertisement display method comprising:

detecting a first operation of a user;

obtaining, in response to the first operation, first context information corresponding to a current scenario of a terminal device, wherein the first context information comprises hardware information of the terminal device, a network environment in which the terminal device is located, and the first operation;

determining, based on the first operation and the first context information, an advertisement location corresponding to the first context information;

generating, based on the first context information and the advertisement location, a first advertisement request comprising the advertisement location;

sending, to an advertisement server, the first advertisement request;

obtaining, from the advertisement server, first advertisement information indicating first advertisement content, wherein the first context information is associated with the first advertisement content; and displaying, based on the first advertisement information, the first advertisement content in an area corresponding to the advertisement location.

9. The advertisement display method of claim 8, wherein the first advertisement request comprises an advertisement parameter corresponding to the first context information, and wherein generating the first advertisement request comprises:

obtaining the advertisement parameter; and further generating, based on the advertisement parameter, the first advertisement request, wherein the first advertisement request instructs the advertisement server to obtain and send the first advertisement information to the terminal device based on the first advertisement request.

10. The advertisement display method of claim 9, wherein the advertisement parameter comprises an advertisement format corresponding to the first context information, an advertisement type corresponding to the first context information, and the advertisement location, which corresponds to the first context information, and wherein the advertisement display method further comprises:

determining, based on the hardware information and the network environment, the advertisement format and the advertisement type; and adjusting, based on a mapping relationship between the first context information and the advertisement parameter, a size or location of an area occupied for displaying the first advertisement content.

11. The advertisement display method of claim 8, further comprising:

obtaining an advertisement unit identifier before generating the first advertisement request; and further generating, based on the advertisement unit identifier, the first advertisement request.

12. The advertisement display method of claim 8, wherein the first advertisement request comprises the first context information, and wherein the advertisement display method further comprises:

obtaining an advertisement unit identifier before generating the first advertisement request; and further generating, based on the advertisement unit identifier, the first advertisement request instructing the advertisement server to determine an advertisement parameter associated with the first context information and obtain and send the first advertisement information to the terminal device based on the advertisement parameter.

13. The advertisement display method of claim 8, wherein after displaying the first advertisement content, the advertisement display method further comprises:

obtaining, from the user for the first advertisement content, a second operation;

obtaining, in response to the second operation, second context information corresponding to the current scenario, wherein the second context information comprises user feedback information, and wherein the user feedback information is associated with the second operation;

generating, based on the second context information, a second advertisement request;

sending, to the advertisement server, the second advertisement request;

obtaining, from the advertisement server, second advertisement information indicating second advertisement content, wherein the second context information is associated with the second advertisement content; and displaying, based on the second advertisement information, the second advertisement content.

14. The advertisement display method of claim 8, wherein the first advertisement information comprises an advertisement identifier and a download path, and wherein before displaying the first advertisement content, the advertisement display method further comprises obtaining, based on the advertisement identifier and the download path, the first advertisement content associated with the first context information.

15. The advertisement display method of claim 8, wherein the first context information further comprises a type of an application currently run by the terminal device, an application theme corresponding to content currently displayed by the application, a user operation triggered on the terminal device, and user feedback information.

16. An electronic device comprising:

a memory configured to store instructions; and one or more processors coupled to the memory and configured to execute the instructions to cause the electronic device to:

detect a first operation of a user;

obtain, in response to the first operation, first context information corresponding to a current scenario of the electronic device, wherein the first context information comprises hardware information of the electronic device, a network environment in which the electronic device is located, and the first operation;

determine, based on the first operation and the first context information, an advertisement location corresponding to the first context information;

generate, based on the first context information and the advertisement location, a first advertisement request comprising the advertisement location;

send, to an advertisement server, the first advertisement request;

obtain, from the advertisement server, first advertisement information indicating first advertisement content, and wherein the first context information is associated with the first advertisement content; and display, based on the first advertisement information, the first advertisement content in an area corresponding to the advertisement location.

17. The electronic device of claim 16, wherein the first advertisement request comprises the first context information, and wherein the one or more processors are further configured to execute the instructions to cause the electronic device to:

obtain an advertisement unit identifier before generating the first advertisement request; and further generate, based on the advertisement unit identifier, the first advertisement request instructing the advertisement server to determine an advertisement parameter associated with the first context information and obtain and send the first advertisement information to the electronic device based on the advertisement parameter.

18. The electronic device of claim 16, wherein after displaying the first advertisement content, the one or more processors are further configured to execute the instructions to cause the electronic device to:

obtain, from the user for the first advertisement content, a second operation;

obtain, in response to the second operation, second context information corresponding to the current scenario, wherein the second context information comprises user feedback information, and wherein the user feedback information is associated with the second operation;

generate, based on the second context information, a second advertisement request;

send, to the advertisement server, the second advertisement request;

obtain, from the advertisement server, second advertisement information, wherein the second advertisement information indicates second advertisement content, and wherein the second context information is associated with the second advertisement content; and display, based on the second advertisement information, the second advertisement content.

19. The electronic device of claim 16, wherein the first advertisement information comprises an advertisement identifier and a download path, and wherein before displaying the first advertisement content, the one or more processors are further configured to execute the instructions to cause the electronic device to obtain, based on the advertisement identifier and the download path, the first advertisement content associated with the first context information.

20. The electronic device of claim 16, wherein the first context information comprises a type of an application currently run by the electronic device, an application theme corresponding to content currently displayed by the application, a user operation triggered on the electronic device, and user feedback information.

* * * * *